United States Patent
Ewoniuk et al.

(10) Patent No.: US 12,461,119 B2
(45) Date of Patent: Nov. 4, 2025

(54) SYSTEM AND METHOD FOR DISPENSE CHARACTERIZATION

(71) Applicant: Ventana Medical Systems, Inc., Tucson, AZ (US)

(72) Inventors: Aaron Ewoniuk, Tucson, AZ (US); Dylan Miller, Tucson, AZ (US); Kevin Talucci, Tucson, AZ (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

(21) Appl. No.: 18/601,690

(22) Filed: Mar. 11, 2024

(65) Prior Publication Data

US 2024/0329074 A1     Oct. 3, 2024

Related U.S. Application Data

(63) Continuation of application No. 17/326,760, filed on May 21, 2021, now Pat. No. 11,959,931, which is a
(Continued)

(51) Int. Cl.
*G01N 35/10* (2006.01)
*B01L 3/02* (2006.01)
(Continued)

(52) U.S. Cl.
CPC ........ *G01N 35/1016* (2013.01); *B01L 3/0241* (2013.01); *G01F 15/075* (2013.01);
(Continued)

(58) Field of Classification Search
CPC .................................................. G01N 35/1016
(Continued)

(56) References Cited

U.S. PATENT DOCUMENTS 4,328,800 A     5/1982   Marx
4,490,801 A    12/1984   Hagan et al.
(Continued)

FOREIGN PATENT DOCUMENTS

GB     2385850 A  *  9/2003   .......... B01J 19/0046
JP     H052025 A      1/1993
(Continued)

OTHER PUBLICATIONS

International Search Report and Written Opinion for PCT/US2017/019732, mailed on May 22, 2017.

*Primary Examiner* — Walter L Lindsay, Jr.
*Assistant Examiner* — Philip T Fadul
(74) *Attorney, Agent, or Firm* — Charney IP Law LLC; Thomas M. Finetti

(57) ABSTRACT

A system and method for dispense characterization is disclosed. According to particular embodiments of the dispense characterization system and method, volumes of dispensed liquids can be determined. In more particular embodiments, additional characteristics, and combinations of characteristics of a liquid dispensing event can be determined. Examples of additional characteristics that can be determined include the shape of the dispensing event, the velocity of the dispensing event, and the trajectory of the dispensing event. The dispense characterization system and method can be employed in automated biological sample analysis systems, and are particularly suited for monitoring liquid reagent dispensing events that deliver liquid reagents to a surface of a microscope slide holding a biological sample.

20 Claims, 26 Drawing Sheets

Related U.S. Application Data continuation of application No. 16/112,438, filed on Aug. 24, 2018, now Pat. No. 11,073,529, which is a continuation of application No. PCT/US2017/019732, filed on Feb. 27, 2017.

(60) Provisional application No. 62/301,221, filed on Feb. 29, 2016.

(51) Int. Cl.
| | | |
|---|---|---|
| *G01F 15/075* | (2006.01) | |
| *G01F 22/00* | (2006.01) | |
| *G01N 1/31* | (2006.01) | |
| *G01N 15/14* | (2006.01) | |
| *G01N 35/00* | (2006.01) | |
| *G01N 15/10* | (2006.01) | |

(52) U.S. Cl.
CPC ............ *G01F 22/00* (2013.01); *G01N 1/312* (2013.01); *G01N 15/1459* (2013.01); *G01N 35/00663* (2013.01); *G01N 35/00722* (2013.01); *G01N 35/1002* (2013.01); *B01L 2200/061* (2013.01); *B01L 2200/14* (2013.01); *B01L 2200/143* (2013.01); *G01N 2015/1027* (2024.01); *G01N 2015/1493* (2013.01); *G01N 2035/00673* (2013.01); *G01N 2035/009* (2013.01)

(58) Field of Classification Search
USPC .......................................................... 73/227
See application file for complete search history.

(56) References Cited

U.S. PATENT DOCUMENTS

| | | |
|---|---|---|
| 5,559,338 A | 9/1996 | Elliott et al. |
| 5,559,339 A | 9/1996 | Domanik et al. |
| 8,420,014 B2 | 4/2013 | Shvets et al. |
| 9,517,464 B2 | 12/2016 | Glasgow et al. |
| 2003/0121335 A1 | 7/2003 | Liu et al. |
| 2008/0184809 A1* | 8/2008 | Shvets ............... G01N 35/1016 73/861 |
| 2012/0095433 A1 | 4/2012 | Hungerford et al. |
| 2014/0150522 A1* | 6/2014 | Glasgow ................ G01F 17/00 73/1.74 |
| 2016/0266154 A1 | 9/2016 | Turgeman et al. |

FOREIGN PATENT DOCUMENTS

| | | |
|---|---|---|
| JP | H05164765 A | 6/1993 |
| JP | 2004251818 A | 9/2004 |
| JP | 2007322244 A | 12/2007 |
| JP | 2012179795 A | 9/2012 |
| JP | 2013121452 A | 6/2013 |
| WO | WO-2009061710 A1 * | 5/2009 ............... G01N 1/38 |

* cited by examiner $$m\ddot{x} + c\dot{x} + kx = F$$

$$x = Ae^{\frac{t\left(-\sqrt{c^2-4km}-c\right)}{2m}} + Be^{\frac{t\left(\sqrt{c^2-4km}-c\right)}{2m}} + \frac{Fm}{k}$$

Dispense Detection Algorithm Flow Chart

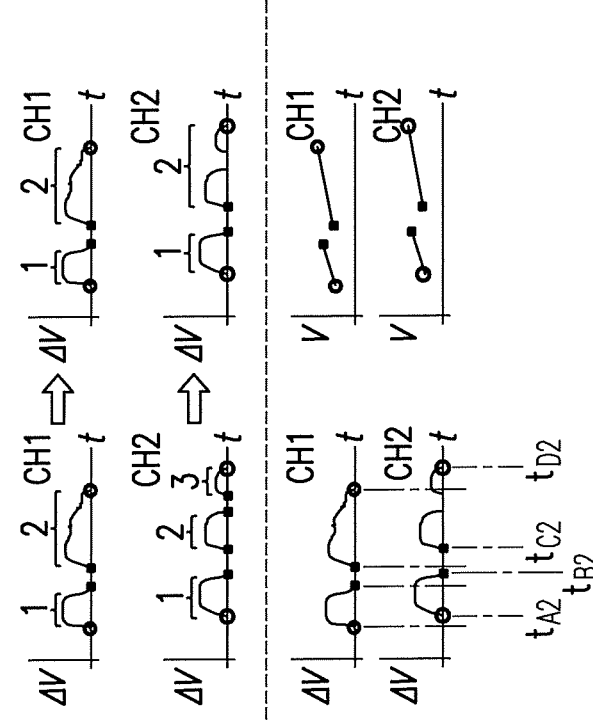

| | OBJECT PAIRING | |
|---|---|---|
| 11 | Harmonize the signals from CH1 and CH2 from step 10 to contain the same amount of objects. This will require combining objects from one signal in order to align with the other signal. | |

| | CREATE VELOCITY PROFILES | |
|---|---|---|
| 12 | Velocity information is measured by analyzing the time shift between sensor outputs of each paired object from step 11. With a fixed known distance between sensors, a velocity profile is generated for each object pair. | |

| | CALCULATE VOLUME ESTIMATE | |
|---|---|---|
| 13 | The volume estimate is calculated by converting the smoothed voltage change from step 10 into a diameter, computing the cylindrical cross-sectional area, numerically integrating over time, and multiplying by the velocity profile from step 12. The result is adjusted to normalized baselines by channel and processed with a linear correlation correction established via characterization data. This algorithm is completed for both channels and the average of both results is the final volume estimate. | |

$$V_{volume} = \frac{\pi}{2} \sum_{i=0}^{N} \left[ \left( \frac{C_1 \Delta V_{voltage}(i+1) + C_2}{2} \right)^2 + \left( \frac{C_1 \Delta V_{voltage}(i) + C_2}{2} \right)^2 \right] * V_i * [t(i+1) - t(i)]$$

FIG. 16C

| ID | Title | Description | Algorithm Visual | Velocity Profile |
|---|---|---|---|---|
| A1 | Signal Duration | The full signal duration from start to finish for Ch1. | | N/A |
| A2 | Signal Duration | The full signal duration from start to finish for Ch2. | | N/A |
| B1 | Event Duration | The sum of the signal durations of each object for Ch1. | | N/A |
| B2 | Event Duration | The sum of the signal durations of each object for Ch2. | | N/A |
| C1 | Integration with Empirical Velocity | The integration of the analog signal with a given velocity for Ch1. | | |
| C2 | Integration with Empirical Velocity | The integration of the analog signal with a given velocity for Ch2. | | |
| D | Integration with Measured Velocity Profile. | The integration of the analog signal with a real-time measured velocity average from both endpoints. Volume average of Ch1 and Ch2. | | |
| E | Integration with Measured Velocity Profiles per Object. | The integration of the analog signal with a real-time measured velocity average for each object. Volume average of Ch1 and Ch2. | | |

Rows A1–B2: Time Correlations
Rows C1–E: Integration Correlations

FIG. 17

SYSTEM AND METHOD FOR DISPENSE CHARACTERIZATION

RELATED APPLICATION DATA

This application is a continuation of U.S. patent application Ser. No. 17/326,760 filed on May 21, 2021, which application is a continuation of U.S. patent application Ser. No. 16/112,438, which was filed on Aug. 24, 2018, which application is a continuation of PCT/US2017/019732, filed Feb. 27, 2017, which claims priority from and the benefit of U.S. Provisional Patent Application No. 62/301,221, filed Feb. 29, 2016, the disclosures of which are each hereby incorporated by reference herein in their entireties.

FIELD

The disclosure relates to a system and method for detecting and characterizing one or more aspects of a liquid reagent dispensing event.

BACKGROUND OF THE INVENTION

Automated systems for analyzing biological samples using liquid reagents often lack a system to verify that each scheduled liquid reagent dispense occurs during an automated analysis procedure. As such, quality control in such systems depends in large part on analysis of control samples. However, unless a control substance is mixed with the sample itself, the result of the analysis of the control sample is only a surrogate for what actually happened in the analysis of a particular sample.

For example, in the context of reagent delivery to a cell or tissue sample mounted on a microscope slide, the current solution is to identify potential reagent dispense errors using control samples that are placed alongside a patient sample on the same slide, or are placed on a separate slide to prepare a "control slide." The control sample and the patient sample are then subjected to the same staining protocol. It is only after the slide(s) is (are) fully processed and reviewed by a pathologist that a potential error can be identified. As such there is no opportunity to correct dispensing errors during the staining process, and valuable time and sample material are wasted. In some instances, it may be 18 hours or more before an error is discovered. Thereafter, a new sample (if available) is processed, further extending the time until a result is obtained and appropriate care can be administered to a patient.

Although it is recommended that on-slide control tissues are used for every patient sample, some labs may only use one control sample on one slide to verify several patient sample slides. In such cases, a properly stained control sample is not a guarantee that all patient samples were also treated with proper reagent volumes. Conversely, an improperly stained control sample resulting from an isolated improper dispense to the control sample could lead to the conclusion that all the samples were stained improperly and should be discarded, when in fact the results of the patient samples could be relied upon.

In systems utilizing robotic pipetting devices it is possible to monitor dispensing events based on pressure excursions attendant to a dispensing event, or through optical detectors in the pipette barrel, but for disposable dispensers, such technology is cost-prohibitive and not applicable in all cases, depending on how the dispenser operates and the identity of the liquid. What is needed, therefore, is a system and method for characterizing liquid dispensing events that can be utilized with any type of dispenser, from sophisticated robotic pipetting systems to simple mechanical dispensers.

SUMMARY

Disclosed is a system and method for characterizing a dispensing event that is agnostic with regard to the type of dispenser used, can be used repeatedly with different dispensers as part of an overall system, and can provide quality control information that helps ensure that potential analysis errors can be identified in real time and corrected if possible and desired. In particular embodiments, the disclosed system and method not only provides confirmation that a liquid reagent was dispensed to treat a sample, but can provide a volume estimate for the liquid dispensed, as well as characteristics of the dispensing event that can be used to identify dispensing events which may lead to errors in an analysis. For example, in the context of applying a liquid reagent to a sample held on a microscope slide, the disclosed system and method can, in some embodiments, be used to confirm that a predetermined volume of a liquid reagent was delivered with a predetermined spatial accuracy to a portion of the microscope slide where the sample is held.

In other particular embodiments, the "shape" of the dispensing event can be detected and used to determine if a successful dispensation of the liquid reagent occurred. For example, in a more particular embodiment, the disclosed system and method can be used to determine if the dispensing event was in the form of slow falling droplets that settle easily onto a microscope slide surface or in the form of a fast moving stream that may splash off of the microscope slide. In yet other more particular embodiments, errors due to how a liquid reagent interacts with a disclosed sensor system as the liquid passes through the sensor can be identified and corrected to provide improved volume estimates for the dispensing event.

Thus, in one embodiment, a system for treating a biological sample is disclosed, the system including at least one dispenser for dispensing a liquid reagent. The dispenser can be, for example, a robotic pipettor, a disposable reagent dispenser, a plumbed dispenser, a blister pack, or any other device or mechanism configured to dispense a liquid reagent into contact with a biological sample without actually touching the sample. The system further includes at least one dispense detector locatable between an outlet of the at least one dispenser and the biological sample, the dispense detector comprising at least one array of emitters and corresponding receivers, the space between the emitters and corresponding receivers of the at least one array forming a first detection region of the at least one dispense detector. The system still further includes a dispense detection unit configured to receive a signal from the at least one dispense detector during a dispensing event that delivers the liquid reagent to the biological sample and output a detected dispense volume of the liquid reagent passing through the dispense detector. In a particular embodiment, the dispense detector includes at least 2 arrays that can be used to determine, in real time, the velocity of a liquid reagent moving from the dispenser to the biological sample, thereby increasing the accuracy of the detected dispense volume output by the dispense detection unit.

Accordingly, in another aspect, a method is disclosed. The disclosed method includes positioning a dispense detector between a dispenser and a biological sample, wherein the dispense detector includes at least one array of emitters and corresponding receivers and the space between the emitters and corresponding receivers of the at least one array forms a first detection region of the at least one dispense detector. A signal is generated by the dispense detector in response to the dispensing event and this signal (which scales, such as linearly, with dispense object diameter) is multiplied by a velocity of the liquid reagent. This product of signal and velocity is integrated over time to yield a detected volume for the dispensing event A further disclosed embodiment of the disclosed system for characterizing a dispensing event includes a dispense detector locatable along a path between a dispenser and a biological sample. The dispense detector includes at least one array of emitters and corresponding receivers, the space between the emitters and corresponding receivers of the at least one array forming at least a first detection region of the at least one dispense detector. A dispense detection unit is configured to receive a signal from the at least one dispense detector during a dispensing event that delivers the liquid reagent to the biological sample, and the dispense detection unit outputs a detected dispense volume according to any embodiment of the disclosed method as further described below.

Additional aspects of the disclosure include a non-transient computer readable storage medium having stored thereon the instructions for performing the disclosed method and a computer program product having stored thereon the instructions for performing the disclosed method. Additional aspects and advantages of the disclosed system and method will become apparent from the detailed description which follows.

BRIEF DESCRIPTION OF THE DRAWINGS

The features and advantages of the disclosed system and method will become further apparent from a consideration of the following detailed description presented in connection with the accompanying drawings in which:

FIG. 16C is a further continuation of steps from FIGS. 16A and 16B for another embodiment of a disclosed algorithm for volume estimation.

FIG. 17 shows a comparison between different algorithms for volume estimation.

DETAILED DESCRIPTION

Figure 1A:
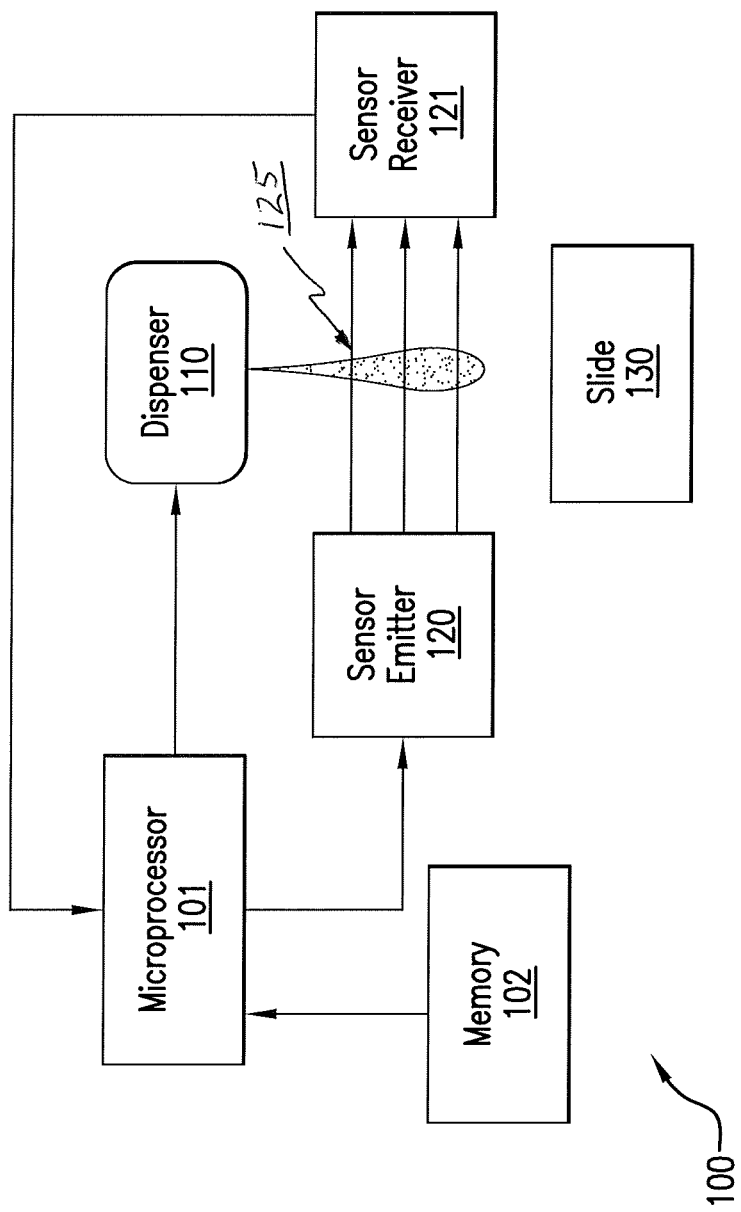
FIG. 1A shows an exemplary schematic diagram of a disclosed system.

A system for treating a biological sample is disclosed that includes at least one dispenser for dispensing a liquid reagent and at least one dispense detector that is locatable (or located) between an outlet of the at least one dispenser and the biological sample. As further illustrated below, the dispense detector includes at least one array of emitters and corresponding receivers and the space between the emitters and their corresponding receivers forms a first detection region of the at least one dispense detector. A dispense detection unit is included that is configured to receive a signal from the at least one dispense detector during a dispensing event and output a detected dispense volume of the liquid reagent.

In some embodiments, the dispense detector comprises at least two arrays of emitters and corresponding receivers. The arrays each form a detection region of the dispense detector, and these detection regions can either be located at the same position between the dispenser and the biological sample or at different positions. In particular embodiments, a first and second array are positioned at different locations along a path between an outlet of a dispenser and the biological sample. As will be described further below, a dispense detector with at least two arrays at different locations along the path between an outlet of a dispenser and the biological sample provides at least two signals that can be utilized by the dispense detection unit to determine the velocity of the dispensing event in real time, and therefore output a more accurate detected dispense volume of the liquid reagent.

In particular embodiments, the dispense detection unit of the disclosed system can be further configured to use one or more signals from the dispense detector to output a characteristic or characteristics of the dispensing event. Examples of such characteristics include one or more of a shape, shape over time, a velocity, and a trajectory of the liquid reagent observed during the dispensing event. For example, as will be further illustrated in the examples that follow, it is possible to use dispense detector signals to differentiate between dispensing events that involve the formation of droplets between the outlet of the dispenser and the biological sample and dispensing events where a stream of the liquid reagent is ejected from the dispenser toward the biological sample. In more particular embodiments such characteristics can be used alone or together with the detected dispense volume to flag a dispensing event that could affect the results of an analysis. For example, where the biological sample comprises a tissue or cell sample adhered to a surface of a substrate (such as a microscope slide), if the dispensing event is in the form of a stream having a high velocity, the sample could be dislodged from the substrate, or the liquid reagent could splash off of the sample and/or substrate.

In the context of a system for analyzing samples mounted on substrates where the system dispenser can be a mechanically actuated removable dispenser (see, for example U.S. Pat. Nos. 5,595,707, 5,654,199, 6,093,574, 6,290,809, 7,217,392, 7,897,108, 8,883,509 and 8,932,543, each of which is incorporated by reference herein), errant actuation of the dispenser (such as with too much mechanical force) or buildup over time of reagent residue on the outlet of the dispenser that leads to blockage can both yield a situation where a dispensed liquid reagent is delivered at a high velocity, and possibly in the form of a stream. Detection of the shape and/or the velocity of such an errant dispense of liquid reagent according to the disclosed system and method can be used to make a determination whether the biological sample needs, for example, to be retreated with the liquid reagent or a second biological sample needs to be analyzed in order to obtain a reliable result for the analysis.

Thus, in other particular embodiments, the disclosed system can further include a dispense error unit. The dispense error unit can be used to compare a detected characteristic, characteristics or any combinations of characteristics for a dispensing event (such as a detected dispense volume) to a predetermined corresponding expected characteristic, characteristics or combination of characteristics (or range of values thereof, stored, for example in a memory accessible by the dispense error unit) to detect potential dispense errors. In more particular embodiments, if the detected dispense volume falls outside of a pre-determined range of expected volumes, the dispense error unit can be further configured to initiate one or more of the following actions: providing an alert to a user; providing instructions to a user to adjust the volume of the liquid reagent in contact with the biological sample; providing instructions to a user to perform a remedial procedure on the sample; automatically performing a remedial procedure on the sample; and, automatically ordering a new analysis of a second biological sample.

While explained below in the context of an automated system for staining tissue and cell samples mounted on microscope slides, the disclosed system is not restricted to systems for analyzing samples held on microscope slides. The disclosed system and method could be employed as a component in any system in which a liquid reagent is dispensed onto or into a biological sample. Examples of such alternative systems include automated PCR analyzers, automated clinical chemistry analyzers, and nucleic acid sequencing analyzers. In such analyzers, the samples are typically held in containers or arrays of containers as opposed to substrates, but as long as a dispense detector according to the disclosure can be located between a dispenser and the biological sample container, the disclosed system and method can be employed. Furthermore, any type of dispenser can be used along with the disclosed system and method. Examples of other types of dispensers include a robotic pipettor, a robotic aspirator (such as "sip and spit" aspirators), a nozzle plumbed to a liquid reagent supply and a blister or capsule that is collapsed to release a liquid reagent.

The disclosed system and method can be utilized as a sub-system of any automated system for staining samples held on substrate (such as a microscope slide), regardless of the type of dispenser or dispensers that are employed therein. Examples of such systems include those listed above with regard to mechanically activated removable dispensers, but further such systems include those disclosed in U.S. Pat. Nos. 6,489,171, 7,553,672, 7,897,108, 8,329, 100, 8,486,714, 8,758,707, and US2015/0343445 (each of which patent documents are incorporated by reference herein), which also disclose various combinations of pipettors, aspirators, blisters, capsules and plumbed nozzles used for dispensing of liquid reagents onto a substrate.

The array of the dispense detector according to the present disclosure can be any arrangement of two or more emitters and corresponding receivers, between which light travels along spatially differentiated paths from an emitter and to its corresponding receiver. More typically, multiple emitters, such as 3 or more, 6 or more or 10 or more, are paired with corresponding receivers to form an array of the dispense detector. However, there is no limit to the number of emitter/receiver pairs in a given array. And, although the illustrative embodiments that follow focus on 1× (W)idth arrays, it is also possible to utilize a single sensor that is a 2-dimensional array of emitters and corresponding receivers of any dimension (H) height×W (such as 2×10, 2×20, 10×10 or 20×20 and perhaps many more in either the W or the H dimension if diode lasers are employed). It should be pointed out that when the H dimension is along a path of a dispensing event from a dispenser to a biological sample, the array signal could be sampled in a way that divides the H dimension into multiple different arrays that are part of the detector. Thus, for example, a 20×20 array could be utilized as anything from two arrays of 10×20 to twenty 1×20 arrays along the dispensing event path. Division of the array in the W dimension is also possible, for example, to sample vertical arrays for dispensing events where the liquid reagent is sent in a direction that completely misses a sample. Regardless of the exact array configurations, the area between the emitters and corresponding receivers of an array or a selected segment of the array forms a detection region of the dispense detector. The array can utilize any type of light source as the emitters of the array, but in particular embodiments, the emitters are LEDs. In other particular embodiments, the light sources utilized as the emitters of the array are laser diodes. A combination of LED and laser diodes can also be utilized to provide a mix of broad versus narrow coverage in the detection region. The wavelength(s) of the light at which the detector array operates can generally be selected from the UV, Visible and Infrared portions of the spectrum, and advantageously, the wavelength is selected such that it is substantially absorbed by the liquid reagent within an expected path length through the liquid reagent as the liquid reagent passes through the dispense detector. It is also possible to have arrays operating at different wavelengths within the same dispense detector.

In embodiments where two or more arrays are part of the dispense detector, the relationship between the location of the emitters and receivers in the various arrays can be such that the light paths in the two or more arrays are parallel or non-parallel. In a particular embodiment, the emitters of a first of the at least two arrays and the corresponding receivers of the first of the at least two arrays are opposite the emitters and corresponding receivers of a second of the at least two arrays to form an anti-parallel configuration. The advantage of placing two or more arrays in one or more anti-parallel configurations between adjacent arrays within the dispense detector is that light from the emitters of one array, since they are on the same side of the dispense detector as the receivers of a second array, are less likely to cause cross-talk between the arrays. In another particular embodiment, the light paths between the emitters and corresponding receivers of the at least two arrays can be non-parallel to each other (such as perpendicular to each other). The advantage of having light paths that are non-parallel is that movement of a liquid reagent in multiple dimensions can be captured to provide a better representation of the shape of the dispensing event, and thus, a better value for the detected dispense volume since dispense cross-section x velocity is what is integrated (or summed by numerical integration) over time for the dispensing event to yield the detected dispense volume. In even more particular embodiments, any combination of parallel, anti-parallel, and non-parallel arrays can be utilized to provide a more accurate representation of the shape of a dispensing event.

In some embodiments of the disclosed system, the dispenser, the dispense detection unit, and a holder for the biological sample are configured to provide relative motion between at least two of the dispenser, the dispense detector, and the holder for the biological sample. Included in such a system can be a controller for controlling the relative motion and for initiating the dispensing event. The controller can be part of a larger automated device for treatment of biological samples according to pre-determined protocols and serve not only to control the relative motion and initiation of a dispensing event. It is possible that the dispense detection unit and the error detection unit described above could be part of the controller of the instrument. Further functions of the controller can be to track samples (such as with barcodes or RFID tags), transport samples, heat, or cool samples, monitor reagent supplies, monitor waste containers, communicate with an LIS (laboratory information system) or a workflow engine, drive a user interface, and the like. Examples of controllers performing these functions and others can be found in U.S. Pat. Nos. 5,595,707, 5,654,199, 6,093,574, 6,290,809, 7,217,392, 7,897,108, 8,883,509, 8,932,543 U.S. Pat. Nos. 6,489,171, 7,553,672, 7,897,108, 8,329,100, 8,486,714, 8,758,707, and US2015/0343445, each of which is incorporated by reference herein.

In a particular embodiment, a holder for the biological sample and the dispense detector are held stationary while the dispenser is configured to move into position relative to the biological sample and dispense the liquid reagent through the dispense detector to the biological sample. In other particular embodiments, the dispenser and the dispense detector are coupled to each other in a dispense assembly such that relative motion between the holder for the biological sample and the dispense assembly positions the dispenser and dispense detection unit to dispense the liquid reagent through the dispense detector to the biological sample; such of arrangement is advantageous where one or a few dispensers (such as pipettors) are used to treat a larger number of samples. In another particular embodiment, the dispenser and the dispense detector are configured to move independently of each other; such an arrangement permits a single (or a few) dispense detector(s) to serve multiple dispensers (such as with removable and/or disposable dispensers). In yet another particular embodiment, the dispenser, the dispense detector and the holders all move independently, bringing all three together according to a predetermined protocol to observe liquid reagent dispensing events as needed during biological sample processing. In another embodiment, the dispenser, the dispense detection unit and a holder for the biological sample are all held in fixed positions relative to each other.

In another particular embodiment of the disclosed system, a calibration mechanism is included that can be used to inserts object of know diameters into the detection region of the dispense detector in order to perform a calibration. Such a mechanism can also be under control of the controller and can be robotically moved relative to the dispense detector to perform the calibration.

As alluded to above, the dispense detection unit can be configured to calculate the detected dispense volume by integrating over time the product of the signal and a velocity of the liquid reagent passing through the dispense detector during the dispensing. In some embodiments, the velocity comprises a velocity stored in memory of the dispense detection unit (or the controller). In other embodiments, the velocity comprises a measured velocity of the liquid reagent as the liquid reagent passes through the dispense detector. In still other embodiments, the dispense detection unit can be further configured to isolate separate dispense objects within the dispense signal profile and sum the detected volumes of the dispense objects to provide the detected dispense volume. The detected volumes of the separate dispense objects can be calculated with either a stored velocity or a measured velocity.

Thus, in another aspect, a method is disclosed for detecting a dispensing event, including, positioning a dispense detector between a dispenser and a biological sample along a path a liquid reagent is expected to follow between the dispenser and the biological sample, the dispense detector comprising at least one array of emitters and corresponding receivers, the space between the emitters and corresponding receivers of the at least one array forming a first detection region of the at least one dispense detector. A signal that is generated by the dispense detector in response to the dispensing event is collected. A product of a velocity of the liquid reagent passing through the dispense detector during the dispensing event and the signal generated by the dispense detector in response to the dispensing event is integrated over time. The integrated dispense detector signal provides a detected dispense volume for the liquid reagent that is delivered to the biological sample during the dispensing event.

In a particular embodiment, the velocity of the liquid reagent used for integrating the signal response over time comprises an average measured velocity for dispensation of the liquid reagent from the dispenser. Such an average measured velocity could be obtained, for example, by utilizing a high speed camera to capture images of dispensing events as a liquid passes reference points having a defined distance between the points, and using the time points in the captured images to calculate a velocity of the liquid, which then could be averaged over multiple dispenses. Such an average velocity can be stored, for example, in memory of the dispense detection unit or a system controller, and used to calculate the detected dispense volume.

In other particular embodiments where the dispense detector further comprises at least a second array of emitters and corresponding receivers, with the second array positioned at a different location along a dispense path between the dispenser and the biological sample to form at least a second detection region, the signal generated by the dispense detector signal comprises at least two different signals, one signal from the at least first array and one signal from the at least second array. In such other particular embodiments, the velocity used for integrating the signal response over time can be the velocity of the liquid reagent measured between the first detection region and the second detection region as reflected in the time it takes for a liquid reagent to create a signal from the first array until the liquid reagent creates a signal from the second array.

In still other particular embodiments, separate objects within a dispense event (such as separate droplets) can be identified within the dispense detector signal, and where there are at least two arrays employed, it is also possible to identify objects that pass through the two arrays and group them together (for example, droplets may split up between the first array and the second array). In even more particular embodiments, a velocity profile for each separate object within the dispense event can be calculated. The velocity profiles for each separate object can be used in the integration step to yield separate detected dispense volumes for each separate object. The sum of the separate detected dispense volumes can then provide the detected dispense volume for the dispense event.

In various disclosed embodiments, the integrating step of the disclosed method comprises numerical integration. A signal from an array of a dispense detector scales with the diameter and cross-section of the object (such as a dispensed liquid reagent) in the detection region of the detector at any particular moment in time. Since the signal(s) will last for particular amounts of time, knowledge of the velocity at which the object is moving within the detector permits calculation of a volume that passes through the detector. For example, a cylindrical object has a certain cross-section and a length. Knowledge of these two parameters permits calculation of the volume of the cylinder. Likewise, knowledge of the cross section ($m^2$) of an object passing through the detection region, the velocity with which the cylindrical object passes through the detection region (m/s) and the time it takes for the cylindrical object to pass through the detection region(s), yields a volume for the object ($m^2 \times m/s \times s = m^3$). Since a liquid reagent dispensed from a dispenser will vary in diameter (and hence cross-section) over time, the total volume of the liquid reagent can be approximated by summing up the volume of cylindrical sections into which the liquid reagent dispense is divided. The more cylindrical sections the dispensed liquid is divided, the more accurately such a representation approximates the true volume contained within the dispensed liquid. At the limit of infinitesimally small sections, the numerical integration approaches the true integrated volume. Furthermore, if it is possible to accurately measure the velocity with which each cylindrical section of a dispensed liquid reagent passes through the dispense detector, the more accurate the volume estimation, since a faster moving section moves more volume through the detector in a given time period. It is thus helpful to have a velocity profile of the dispensed liquid reagent that compensates for differences in velocity during the dispensing event. For example, as a dispensed volume of liquid begins to break up and form into droplets, surface tension will tend to cause the leading edge of the drop in the direction it is falling to move more slowly as it is attracted back to the center of the forming droplet's mass. Likewise, the tailing end of a forming droplet will be pulled along and move faster than the center of the forming droplet's mass. Furthermore, due to acceleration due to gravity, the dispensing event velocity increases the further from the dispenser nozzle the event is monitored. Thus, in particular embodiments, two or more arrays are utilized to obtain velocity profiles for individual dispense objects so as to improve the accuracy of the numerical integration that yields a detected dispense volume.

In particular embodiments, the detected dispense volume is compared to an expected volume for the dispense event, and if the detected dispense volume falls outside of a pre-determined range of values around the expected volume, one or more actions can be initiated. Such actions include: providing an alert to a user; instructing a user to adjust the volume of the liquid reagent in contact with the biological sample; instructing the user perform a remedial procedure on the sample; automatically performing a remedial procedure on the sample (such as removal of the initially dispensed liquid followed by a re-dispense, or by dispensing a supplemental amount to ensure the desired volume of liquid reagent is achieved); and, automatically ordering a new analysis of a second biological sample (such as by automatically sending a request to an LIS, which can generate the order, and then possibly send the order to a workflow engine that informs a laboratory technician to prepare a new sample).

In a more particular embodiment, automatically performing a remedial procedure on the sample comprises automatically removing the liquid reagent in contact with the biological sample (such as with an air knife or liquid blotter) and re-applying the liquid reagent a second time. Advantageously, removing the liquid reagent is performed within 10% of a total time the liquid reagent is scheduled to remain in contact with the biological sample, and as can be expected, the sooner removal and reapplication are performed, the better. Once a reagent is in contact with a biological sample it will begin to react with the sample. Leaving the reagent in contact for too long before re-applying the reagent will lead to over-reaction of the sample with the reagent if it is applied a second time. Thus, in even more particular embodiments, the volume of reagent that is re-applied, or the time the reagent is scheduled to remain in contact with the sample, can be reduced to compensate for the time the first application of the reagent remained in contact with the biological sample.

As discussed in more detail in the examples that follow, the disclosed method can also further include smoothing or otherwise manipulating the signal generated by the dispense detector prior to the integrating step in order to remove or reduce signal artifacts due to the optical properties of the liquid reagent. In instances where the wavelength of light emitted by the emitters is not fully absorbed by the liquid reagent, the liquid reagent can act like a lens and concentrate light from an emitter onto a receiver (so-called lensing effect), thereby leading to errors in the detected diameter (and cross-section) of the liquid reagent passing through the dispense detector.

Thus, it can be advantageous to utilize emitters and receivers in the dispense detector array (or arrays) that operate at a wavelength that is absorbed by the liquid reagent. Even more advantageously the wavelength that is absorbed by the liquid reagent comprises a wavelength that is substantially absorbed by water since water is often the solvent used in reagents for analyzing biological samples. In particular, infrared radiation may be utilized as water has significant absorption in the infrared spectrum, for example, in the near-IR region of the electromagnetic spectrum. Alternatively, it is possible to add to a liquid reagent an inert molecular entity that substantially absorbs the light emitted by the emitters of the dispense detector.

In yet another aspect, a system is provided for detecting a dispensed liquid reagent along a path from a dispenser to a biological sample that includes a dispense detector locatable along the path between the dispenser and the biological sample. The dispense detector can include at least one array of emitters and corresponding receivers, the space between the emitters and corresponding receivers of the at least one array forming at least a first detection region of the at least one dispense detector. Also included is a dispense detection unit configured to receive a signal from the at least one dispense detector during a dispensing event that delivers the liquid reagent to the biological sample and configured to output a detected dispense volume according to any embodiment of the disclosed method.

Further disclosed aspects include a non-transient computer readable storage medium having stored thereon the instructions for performing at least one of the embodiments of the disclosed method. Likewise, a computer program product is disclosed, the program product having stored thereon the instructions for performing at least one of the embodiments of the disclosed method.

As used herein, "a" and "the" are meant to include both the singular and plural referents. Thus, for example, reference to "a dispenser" or "the dispenser" includes one or one or more dispensers. As used herein, the term "about" refers to plus or minus 10% of the referenced number's value, for example plus or minus 5% or the referenced number's value such as plus or minus 1% of the referenced number's value.

EXAMPLES

As shown in FIG. 1A, in one embodiment, the disclosed system comprises a dispenser (110), a dispense detector (118) including emitter array (120) and corresponding receiver array (121), a microprocessor (101), and a memory (102). The dispenser is positioned above a microscope slide (130) holding a biological sample. The dispenser may be any device capable of dispensing a liquid, such as a pipette, a mechanical dispenser, a disposable dispenser, a blister, or capsule that is opened, a robotic pipettor, a plumbed liquid dispenser, or a syringe. The dispense detector sensor comprises an array of emitters (120) and a corresponding array of receivers (121) positioned on opposite sides of the path of fluid dispensed by the dispenser to form a detection region (125) in-between. Thus, light from the emitter passes through the detection region before being observed by the receiver, and if a liquid reagent is present in the detection region, some portion of the light is blocked from reaching the receiver. In this embodiment, the microprocessor is operatively connected to the dispenser and the dispense detector's optical sensor such that the microprocessor can operatively control the dispenser and receive an analog signal from the sensor. The memory stores instructions executed by the microprocessor to analyze the analog signal to determine if liquid was dispensed and in what volume. In a particular embodiment, the microprocessor functions as a dispense detection unit. For instance, the microprocessor monitors a valve signal, which initiates pneumatics for the dispenser. In some embodiments, the microprocessor is not physically connected to the dispenser directly. The microprocessor is an enabling system that can provide inputs to the central operating system, which in turn can act on the information accordingly based on the dispense results. The microprocessor can gather information to be processed and acted upon. The dispenser system is interpreting the sensor information and then relaying the current state of information, such as volume and presence or absence of a dispensing event.

Figure 1B:
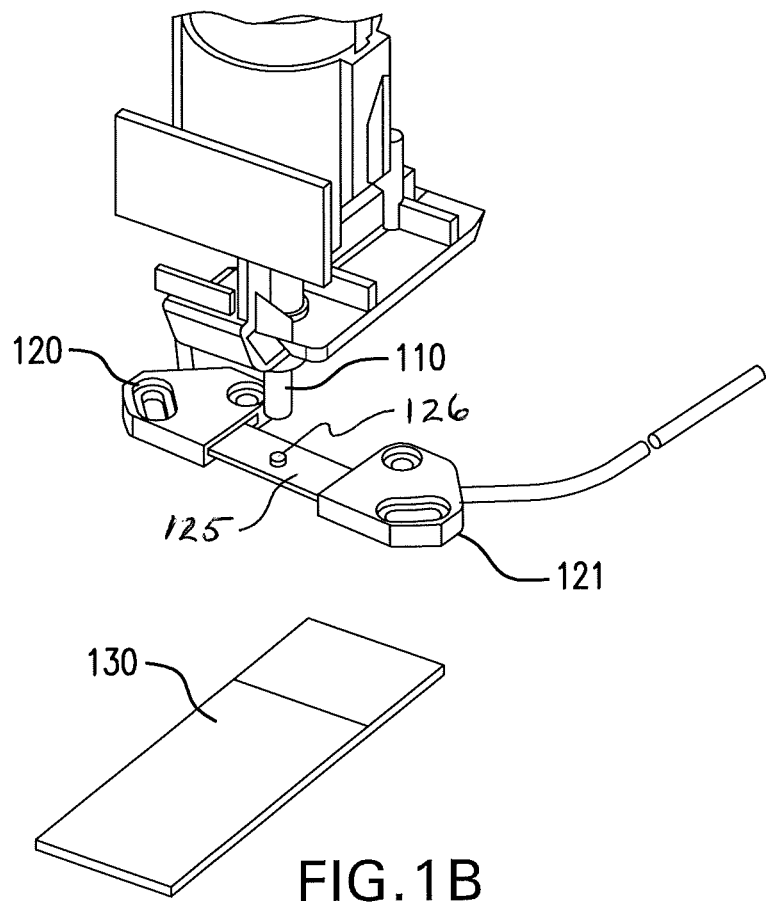
FIG. 1B shows an exemplary dispense detection system.

FIG. 1B shows a dispenser (110) positioned above a microscope slide (130) with a dispense detector (118) including an array of emitters (120) and an array of corresponding receivers (121) that together form dispense detection region (125) through which a liquid (126) passes when dispensed properly to microscope slide (130) below.

Figure 1C:
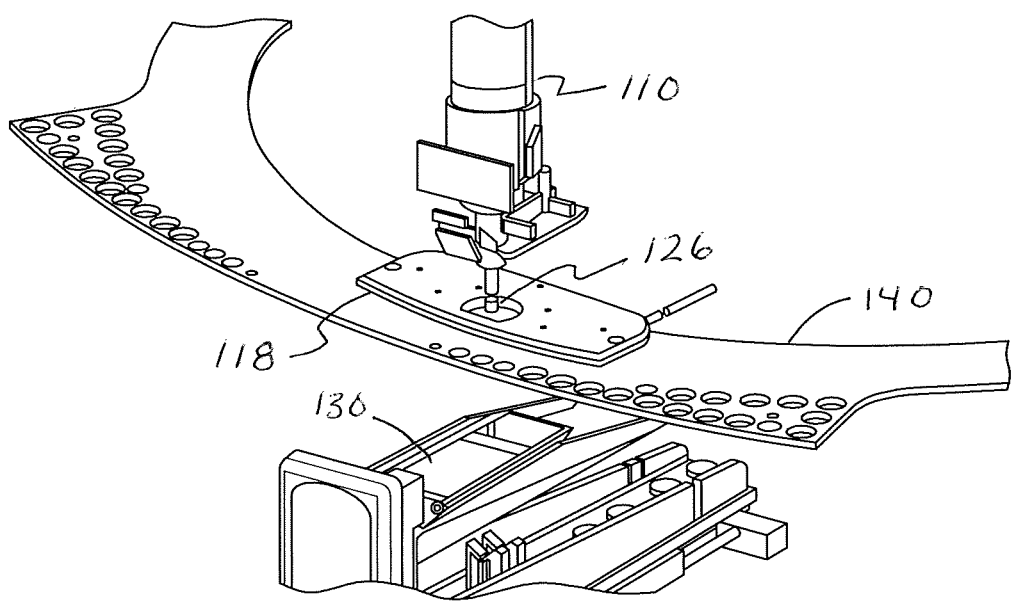
FIG. 1C illustrates an embodiment of a disclosed dispense detection system mounted into a relative motion system that brings liquid reagent dispensers and a dispense detector into position above a biological samples.

FIG. 1C shows a dispenser (110) dispensing a liquid (126) through the dispense detector (118) onto microscope slide (130). In this embodiment, dispense detector (118) is mounted on a drip plate (140). Drip plate (140) which is moveably mounted and robotically controlled imparts motion of dispense detector (118) relative to dispenser (110) and microscope slide (130) such that dispense detector (118) can be moved to and located between a given dispenser (110) and a biological sample on microscope slide (130). In this embodiment, microscope slide (130) is stationary, but both dispenser (110) and dispense detector (118) can be moved independently.

Figure 2:
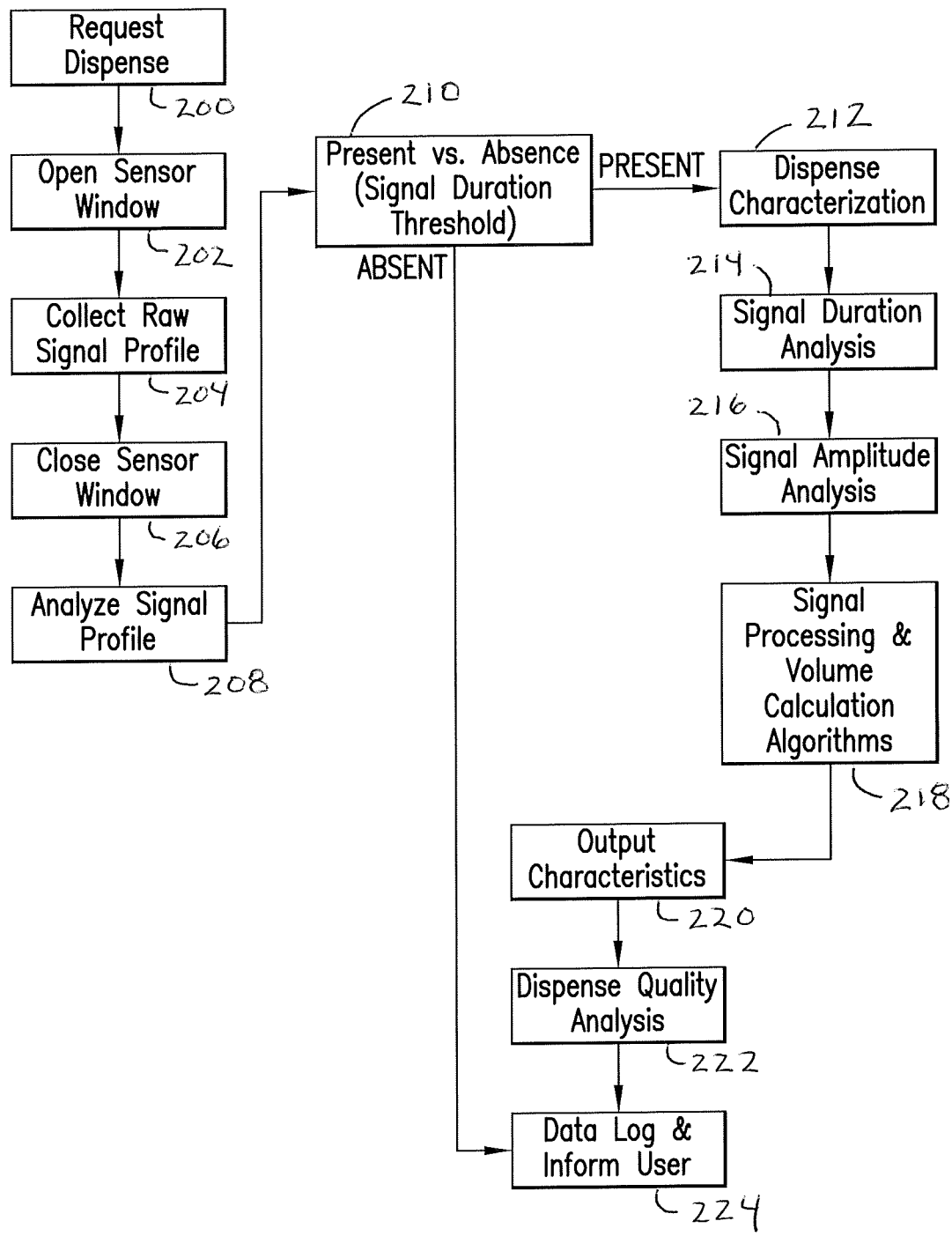
FIG. 2 illustrates a process flowchart of an embodiment the disclosed method.

FIG. 2, shows an exemplary embodiment of the instructions executed by a microprocessor (such as in the dispense detection unit or in a controller for an instrument system) to analyze a dispensing event. The microprocessor sends a signal requesting a dispensing event from the dispenser (200), which causes the dispenser to release liquid while also opening a detection window (202). The microprocessor then collects the analog signal output from the dispense detector (204) based on the pre-determined window of time. The microprocessor then analyzes the signal profile (208), which can include the following steps: First, determining if the dispense was present or absent (210), based on the duration for which the receiver voltage is below a threshold. If the dispense is absent, the dispense failure is recorded to the data log and reported to the user (224). If the dispense was present, the dispensing event is characterized (212) for duration (214) and amplitude (216), and a volume of the dispensing event is estimated (218), output characteristics are collected (220), a dispense quality measure is computed (222), and the data is recorded to the log and reported to the user (224). In particular embodiments, the information regarding the dispense quality can be compared to predetermined values or characteristics and used to determine at least whether: a dispense occurred at all, was the dispense the correct volume, did the dispense have the correct trajectory, was the dispense velocity profile typical or atypical, is the dispenser failing, and which biological samples are possibly affected by an atypical dispense.

Test Bed Development

Figure 3:
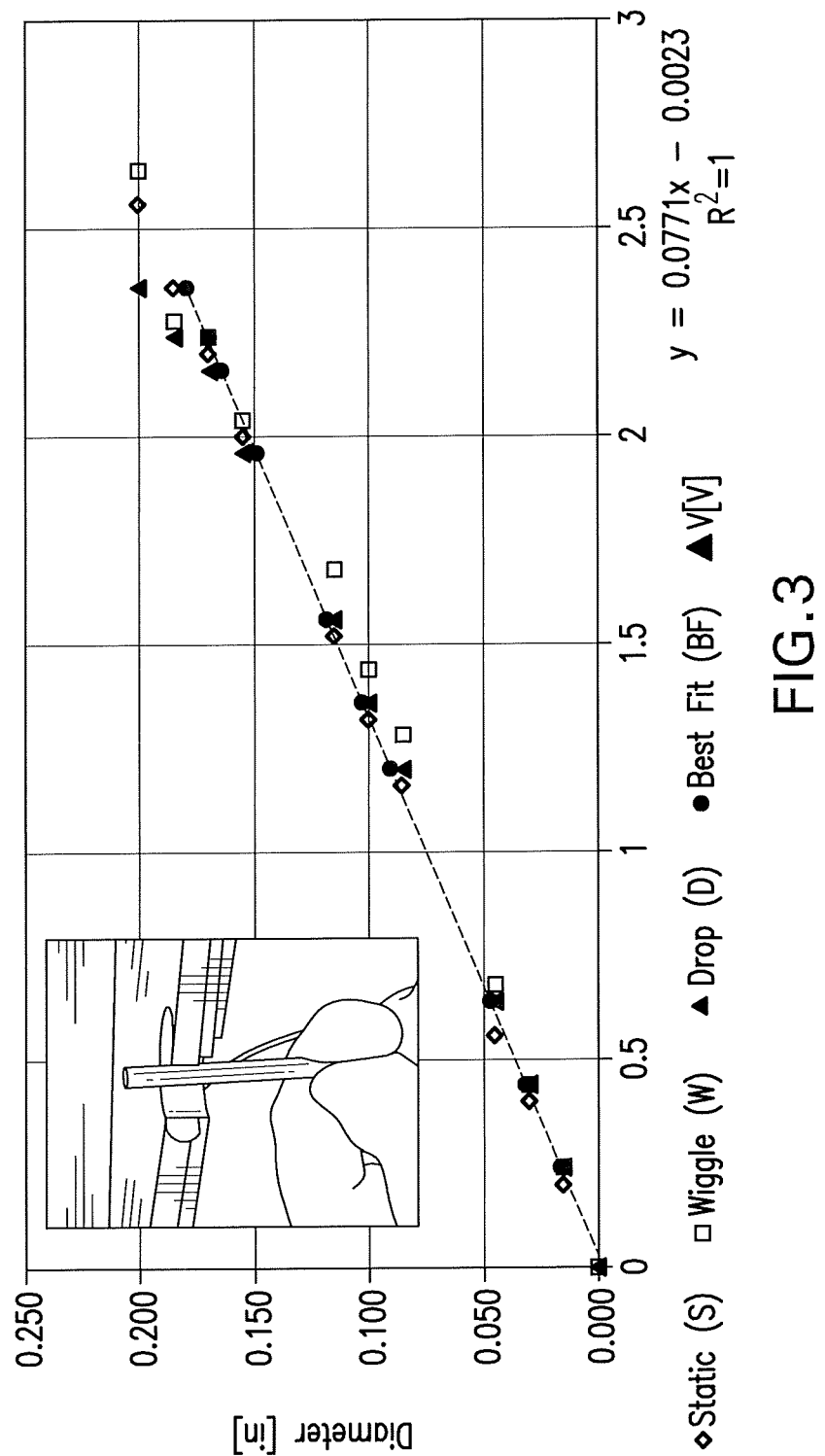
FIG. 3 shows a graph of pin gauge diameter vs. analog sensor voltage for a disclosed array.

A test bed was constructed to test and characterize an optical through-beam sensor assembly. The test bed was used to collect dispense data across multiple reagents selected for their contrasting fluid properties, such as color, opacity, and viscosity. Examples of said reagents include tap water, and propriety staining reagents of Ventana Medical Systems, Inc., such as Hematoxylin II, ISH Protease 3, and Bluing Reagent. Sensor characterization was conducted by utilizing a control set of appropriate sized pin gauges dropped through the sensor. As illustrated in FIG. 3, the analysis shows there is a direct correlation between pin gauge diameters versus light occlusion for sensor analog output. Reagents were found to occlude less light than their similar diameter pins due to their different optical properties, however, a strong correlation was found for 'light occluded vs. droplet diameter.'

Empirical data collected from high speed camera capture and subsequent MATLAB image analysis found similar average velocities for normal dispenses which can be used as a fixed parameter the volume calculations as discussed further below. The dynamics of collapsing a mechanical dispenser to induce a displacement of an incompressible fluid reagent was found to be directly related to the signal profile of the fluid exiting the dispenser nozzle. A characterization activity was conducted where the stroke length of the dispenser's total collapse was shortened using two methods. Shortened dispenses due to early stops shows a logarithmic trend for volume vs. signal duration. Shortened dispenses due to increased gap between the hammer and the dispenser shows an exponential trend. Both data sets together formed an envelope representing possible dispense volumes and signal duration combinations.

In addition, a third independent volume estimation method was developed that involved finding the area under the curve for the captured signal profile of dispenses. High speed camera analysis confirmed that geometric fluid symmetry is sustained for normal falling dispenses in which a captured voltage signal can be converted to an instantaneous cross-sectional area based on the relationship between the voltage and the dispense diameter. This relationship is used to calculate an estimated volume through numerical techniques. This method was reduced to practice in embedded software.

Dispense velocity may be determined differently based on the amount of sensors used in the system. In one embodiment, such as a one sensor pair, the dispense velocity is empirically derived from high-speed camera data, and used for all dispenses. In another embodiment, such as two sensor pairs, the dispense velocity as a function of time is measured and used within the volume estimation calculations for each dispense. The second sensor array positioned in series with the first sensor array permits real-time velocity capture. In yet another embodiment, such as a one sensor pair and one reflective sensor, the dispense velocity is measured and used within the volume estimation calculations for each individual dispense. It is understood that many appropriate configurations may exist, such as two reflective sensors or one sensor pair and mirrors.

For systems containing more than one sensor, the signal output from each sensor is compared with each other to gather information such as at least an initial and final velocity. This information can be used to generate velocity profile as a function of time estimation for the given dispense that can improve the accuracy of the volume estimation numerical methods. Real-time velocity estimations are also used for dispense quality evaluations.

Reagents

A set of reagents having different fluid properties were assessed. Hematoxylin II, ISH Protease 3, and Bluing Reagent are propriety staining reagents of Ventana Medical Systems. Hematoxylin II is more viscous then water and less transparent, while ISH Protease 3 was viscous but clear like water. Bluing Reagent is used in many advance staining kits and also had a different viscosity than water.

Sensor Selection and Description

In some embodiments, an optic sensor has advantages over other methods such as weight capture because it can detect each dispense from a single sensor pair mounted on the rotating arm of a dispense instrument, whereas weight detection would require a sensor at each dispenser or slide position. For exemplary purposes, a fiber optic through-beam sensor was selected for its simple form, compact fit, and adjustable functionality. Although embodiments described herein may utilize optic sensors, it is understood that any appropriate sensor may be used for detecting dispense events in accordance with the present disclosure.

The optical through-beam sensor assembly of this embodiment comprises a three piece set of an amplifier/controller and the emitter and receiver pair. The sensors operate via fiber-optic through-beam technology, which means that a specified wavelength of light spans the distance between an emitter and its receiver to form a detection region. As an object passes through the area between the emitter and the receiver, it will block a portion of the light array from entering the receiver and provide a signal change that can be monitored.

In some embodiments, the through-beam sensor comprises a control module and two fiber optic array units. As an exemplary configuration, the fiber optic arrays are pointed at each other in the same plane with one emitting light and the other receiving the light. In one embodiment, the control module monitors the amount of light received and changes its digital output according to a threshold metric assigned by the user. In another embodiment, the analog output is directly proportional to the amount of light received and can be tuned through multiple settings within the control module.

In one embodiment, the sensor can have the ability to 'tare' its zero-state signal to accommodate when the sensor pair becomes dirty and can be used to flag the dispense detector for maintenance. For instance, the baseline signal for each dispense may be adjusted by measuring the baseline signal before and after the dispensing event, and setting the baseline signal to a lower baseline if the sensors are dirty. This can provide for more control on a per-dispense-signal-adjust for the baseline voltage.

In some embodiments, a through-beam sensor configuration of the dispense detector is capable of detecting the presence or absence of a dispensing event. For example, the emitter and receiver can be positioned in a way to have the dispensed fluid pass through the array of light as they travel from the dispenser nozzle to a microscope slide holding a biological sample. As the dispensed fluid passes through the sensing array, a signal profile is generated from the digital output of the sensor module. The digital output will alternate between HI and LO (5V and 0V) based on the amount of light received and the threshold set by the user. For the purpose of dispense detection, the control module settings were adjusted to have a HI signal produced if the amount of light received drops below a specified threshold. This means that if enough of the dispense fluid is in between the emitters and the corresponding receivers, the digital output will turn HI, indicating a dispensing event. Alternatively, when there is nothing in between the emitter and the receiver, the digital output is LO, indicating the absence any objects or fluids in the sensing array.

In one embodiment, the disclosed system can determine the presence or absence of a dispensing event by processing the raw signal during the time period of when the dispensing event is expected to occur, which would provide sufficient information to determine if there was a dispense, an abnormal dispense, or no dispense at all.

According to some embodiments, a prototype bracket was used for the purposes of protecting the emitter and receiver from rogue drips while positioning them in an area to monitor dispensing events. A drip shield with dispense through-hole provided an area for every dispensing event to pass through.

With the through-beam sensor mounted on an instrument, some dispense detection development code and electronic hardware was adjusted to accommodate a triggered sensor timing window. On the lab bench, the sensor data was recorded at specific intervals with controlled dispenses. On the instrument, the sensor data needed to only be recorded when a dispensing was expected. This means that an interrupt feature was implemented into the code to constantly monitor the state of a dispense hammer that actuates mechanical dispensers. When a hammer valve was opened via the instrument control, the dispense detection code would be triggered to begin looking for the dispensing event. After a set amount of time, the sensing window would close, the recorded data would be analyzed, and the dispensing event would be evaluated on pass-fail criteria of signal length. This process was implemented and observed with LED outputs. For example, when the system was triggered to look for a dispensing event, a green LED would turn on. If enough fluid passed through the sensor in the given expected time, a red LED would turn on indicating a successful dispensing event has occurred. Alternatively, if there was no dispense, or if there was not enough fluid, the red LED would remain off, indicating a questionable or absent dispense.

In a further embodiment, the test bed was enhanced to identify and explore sensor technologies suitable for monitoring each dispense with a quantitative volume output. This test bed collected data for several dispenses of multiple reagents selected for their contrasting fluid properties, which included tap water and the propriety staining reagents of Ventana Medical Systems, such as Hematoxylin II, ISH Protease 3, and Bluing Reagent. An oscilloscope was used to capture analog and digital outputs into .csv files, a high speed camera collected dispense motion frame by frame, and a precision balance collected dispense weights. A prototyping Arduino board with a custom shield and processing GUI was developed to control the test bed. The oscilloscope, high speed camera, and dispense system worked on a single trigger within the system to collect data by means of multiple physics simultaneously, such as by light occlusion and video. This data was analyzed for sensor characterization, physical modeling, and system analysis.

Sensor Characterization

Two sensor characterization experiments were conducted. The first experiment explored the relationship between the dispense size and the sensor output. The second experiment explored the relationship between the sensor and the dispense location (within the sensor field). In both experiments, pin gauges of different diameters were used to represent the simplest form of dispense: a constant cylinder of opaque material. The data from the pin gauges was used as a baseline understanding of the sensor before looking into other aspects of dispense detection such as fluid transparency and viscosity. Pin gauges of known diameters and volumes were dropped through the sensor field in order to develop a correlation between object diameters and the amount of light received.

Ten pin gauge sizes used in the characterization of the sensor modules are as follows (inches): 0.200, 0.185, 0.170, 0.155, 0.115, 0.100, 0.085, 0.045, 0.030, and 0.015. For the first sensor characterization experiment, the sensor field was exposed to the various pin gauges in order to understand the relationship between the analog voltage output and pin gauge diameters. The pin gauges were inserted between the emitter and receiver using three different methods. First, the pin gauge was held in the center of the sensor field. Second, the pin gauge was wiggled around throughout the field in order to find the minimum voltage output (a.k.a. the maximum voltage change from baseline). Lastly, the pin gauge was dropped through an alignment tube through the center of the sensor field. These three data sets are plotted on FIG. 3. A sample pin gauge is inserted in sensor field by hand as shown in FIG. 3 to demonstrate the method for sensor characterization. FIG. 3 shows the three data sets from the pin gauge diameter vs. analog sensor voltage experiment alongside the "best fit" solver data for the pin drop data. This characterization experiment demonstrated that the sensor analog voltage has a strong linear relationship with the pin gauge diameters.

Figure 4:
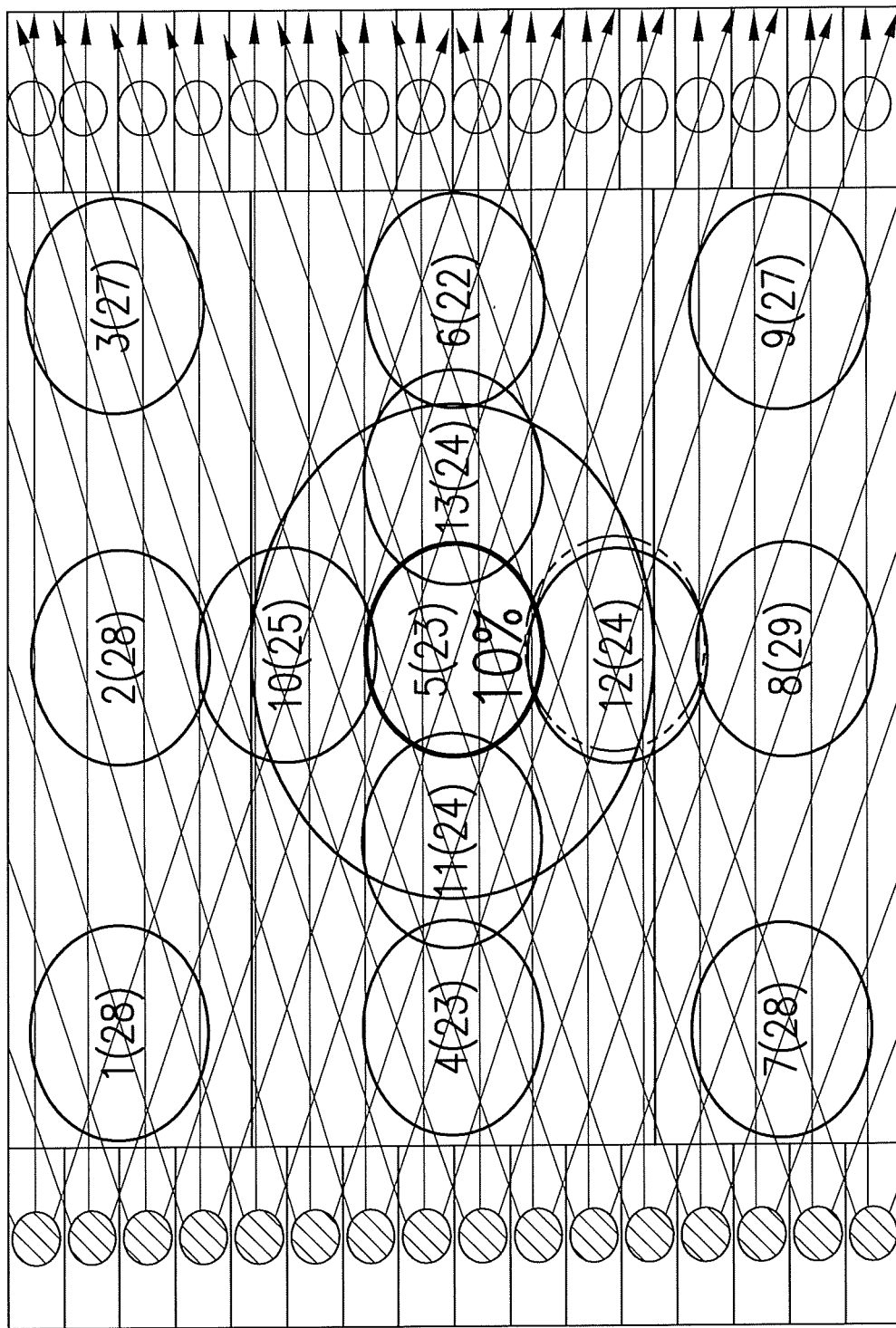
FIG. 4 depicts a theoretical optical sensor mesh grid (gradient) analysis.

In the second sensor characterization analysis, the sensor field was exposed to the same pin gauge in different locations. FIG. 4 shows the results of the theoretical analysis of the sensor field. The cross-hatched circles along the left side of the frame represent the fiber optic ends of the emitter unit of a dispense detector. The open circles along the right side of the frame represent the fiber optic ends of the receiver unit. Each fiber of the emitter unit is assumed to project light in a cone towards the receiver unit. These cones are represented by three arrows (1 straight and 2 at a constant angle) per emitter. As these cones overlap, more light is concentrated in the center of the field. Each large circle numbered 1 through 13 represents a potential location for a pin gauge to drop through the sensor field. The other numbers inside these larger circles represent how many arrows reach the receiving side without getting blocked by the pin. The result of this analysis demonstrates that the most sensitive and accurate zone of the sensing area rests along the center horizontal stripe.

Figure 5:
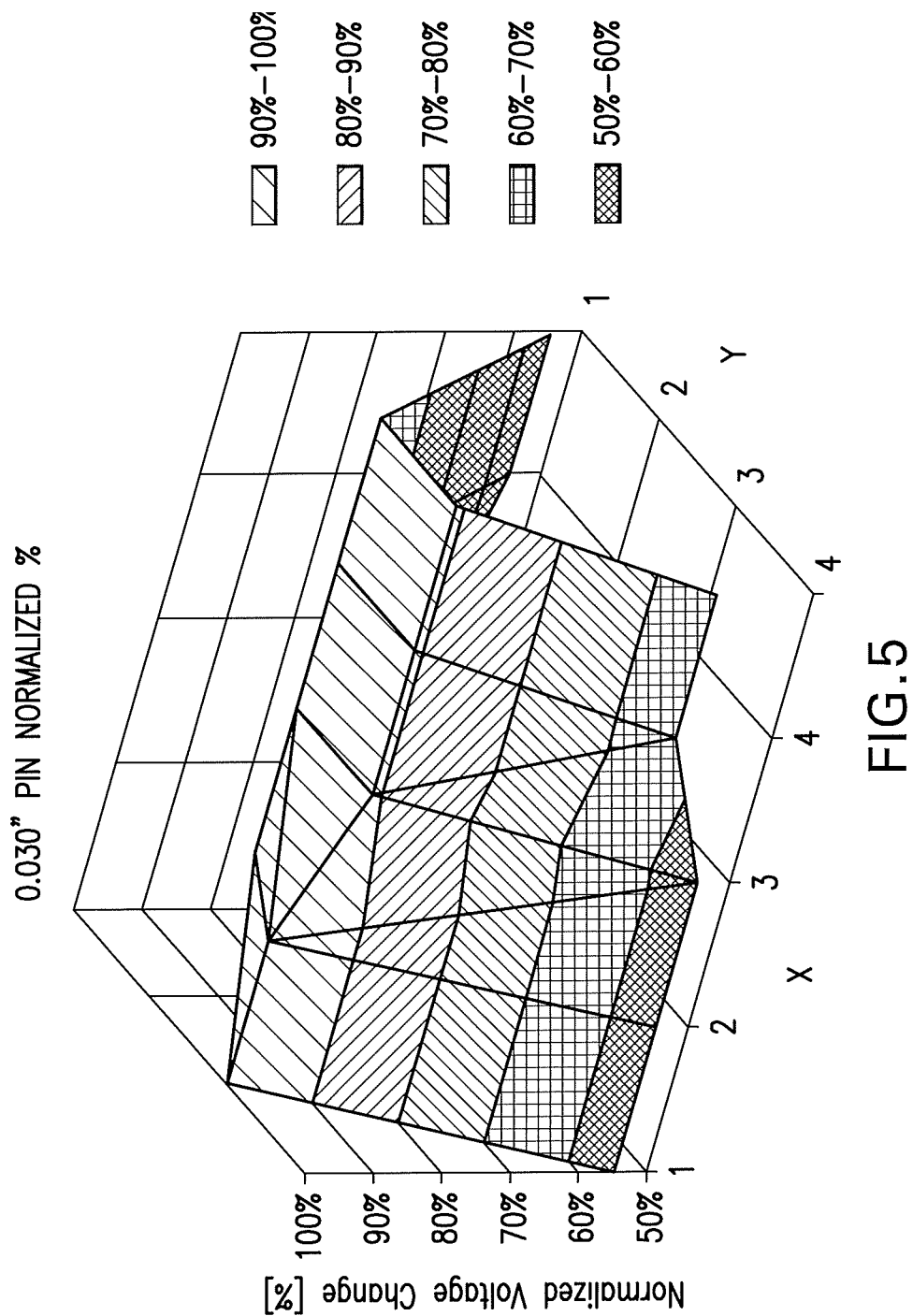
FIG. 5 depicts an empirical optical sensor mesh grid (gradient) analysis.

In order to confirm the theoretical sensor field analysis discussed above, an experiment was conducted by dropping a constant pin gauge diameter through different locations of the sensor field. The analog voltage output was recorded for each location and graphed in a 3D contour plot shown in FIG. 5. The 3D contour plot shows the results of a 0.030" pin gauge dropped though the different areas of a 5×4 grid above the sensor area. The X coordinate corresponds to moving from emitter to receiver and the Y coordinate corresponds to moving from back to front. After normalizing the results against the true (center) measurement, it can be seen that these experimental results matched the theoretical analysis well.

System Analysis

Figure 6A:
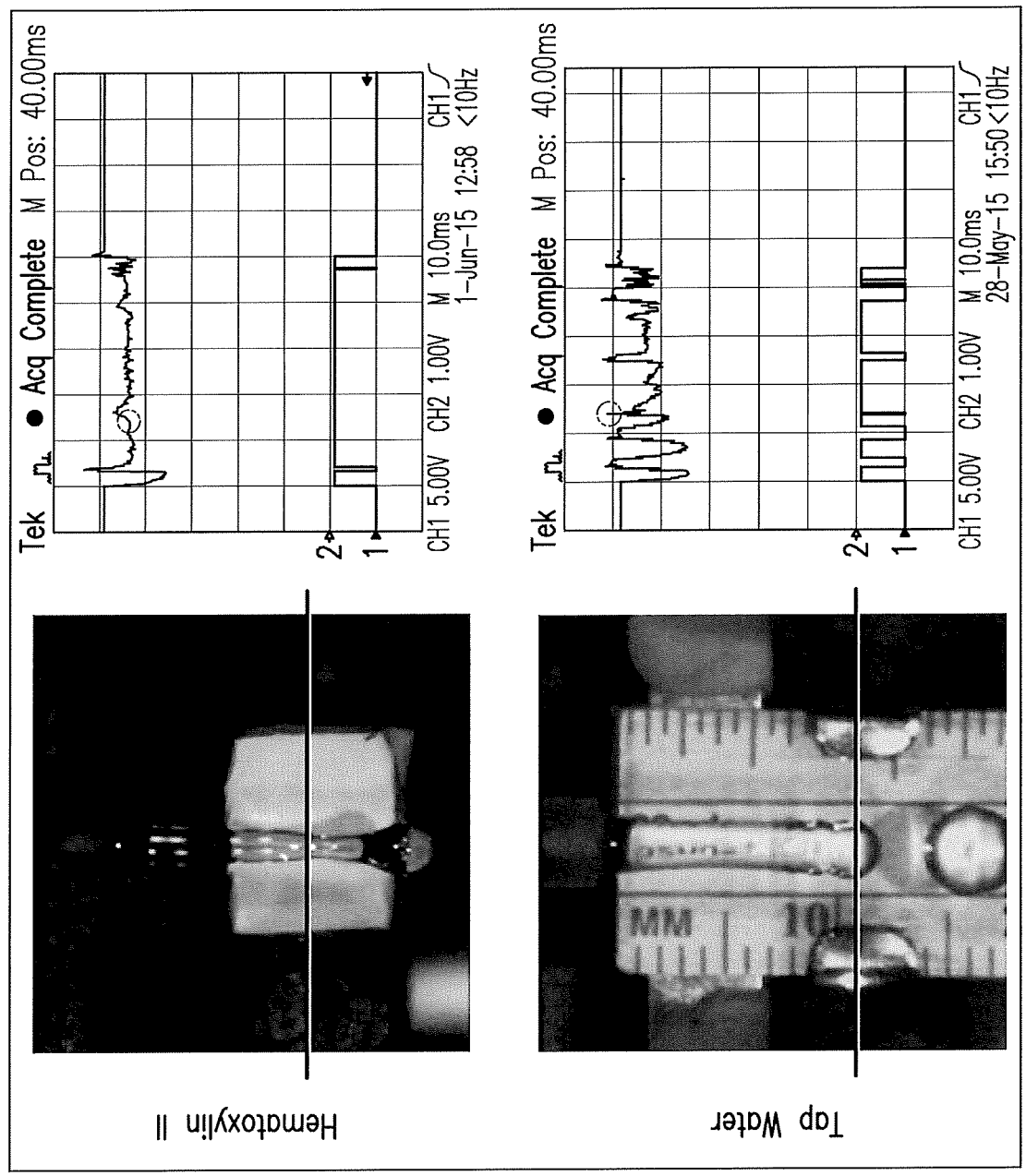
FIG. 6A shows voltage signal profiles vs. reagent for a hematoxylin solution and tap water.

The dispenser and sensor together were analyzed as a system. Three experiments were conducted to understand how changes to this system would affect the sensor output. First, the different reagents were dispensed through the sensor to understand how transparent fluids of different viscosities would affect the signal. The through-beam sensor was investigated for the purposes of monitoring each dispense with a quantitative volume output. As shown in FIG. 6A, the addition of an analog output (top trace) enables the ability to monitor the amount of the light received versus only the threshold true/false capabilities of the digital signal (bottom trace). In FIG. 6A, the signal profile and stills from high speed camera footage of two dispenses where compared. The first dispense was of Hematoxylin II. The second dispense was of tap water. Clear differences can be seen in the analog and digital signals of these two samples. For example, Hematoxylin II tends to be more stream-like for a longer period and water tends to break up into drops much sooner during the dispense. Two other major observations are that the fluid can act as a lens and spike the signal and all dispenses seem to have similar durations. In some embodiments, a two sensor configuration can provide information to allow for adjustment of the empirical average velocity for fluids with different viscosities and determining the specific velocity profile by reagent without having any prior information about the fluid. This can also eliminate concerns about temperature effects on the fluid properties, which could slightly have an effect on the exit velocity.

Figure 6B:
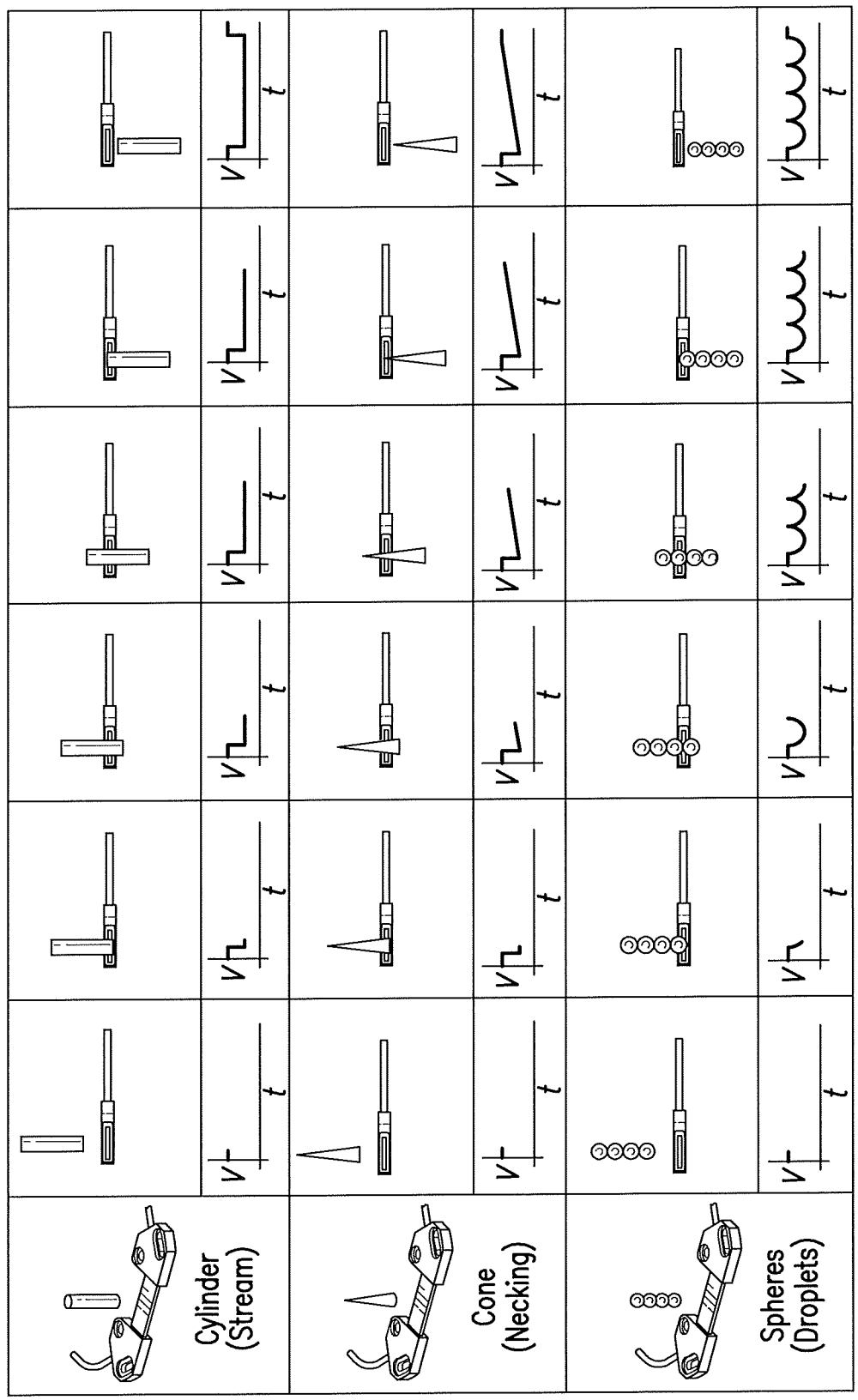
FIG. 6B shows exemplary voltage signal profiles captured for dispenses (or objects) having varying geometries as they pass through the detection region of a disclosed dispense detector.

FIG. 6B shows how theoretical dispense geometry is expected to affect the signal profile obtained from the dispense detector sensor arrays. In the top panel, a cylindrical dispense profile provides a signal shape that was seen with the pin-gauges. In some instances, the liquid reagent being dispensed will start to neck as it falls from a dispenser. The necking behavior also provides a distinct type of signal profile as shown in the middle panel of FIG. 6B. Finally, as shown in the bottom panel of FIG. 6B, spherical droplets also provide a signature signal profile. In reality, a given dispense may have components of each type of dispense, but overall the analysis demonstrates how dispense signals can be used to extract additional information regarding the characteristics of a dispensing event beyond a simple confirmation that a dispensing event occurred.

Figure 7A:
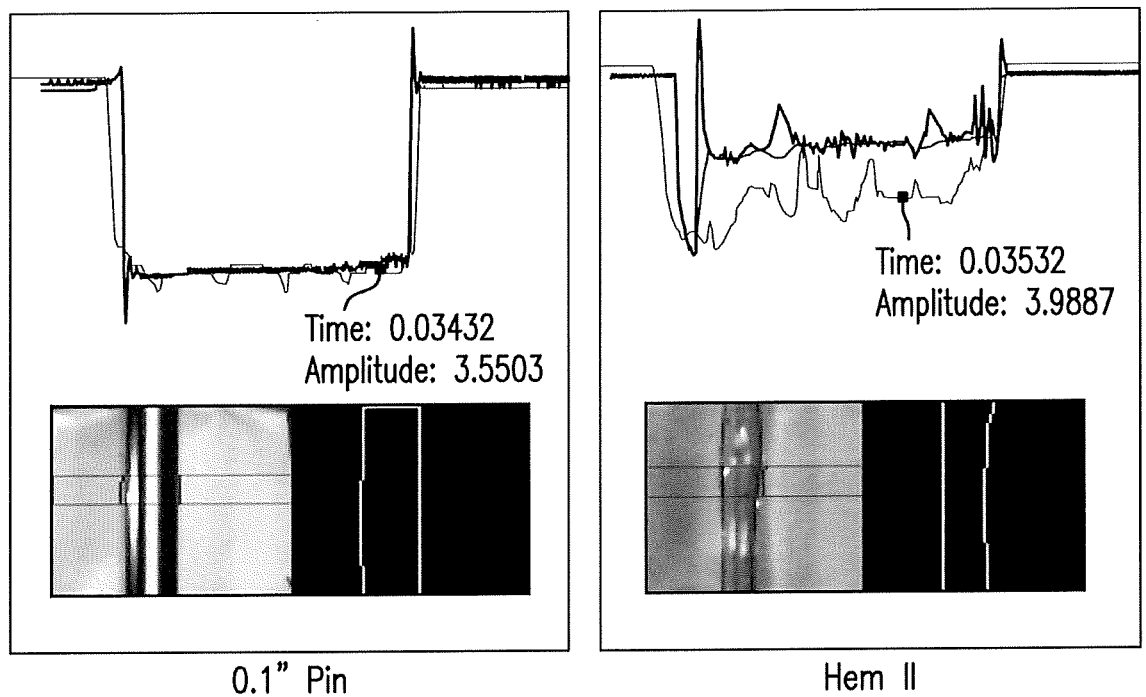
FIG. 7A shows a MATLAB image analysis tool outputs for a 0.1" pin and a staining solution.
Figure 7B:
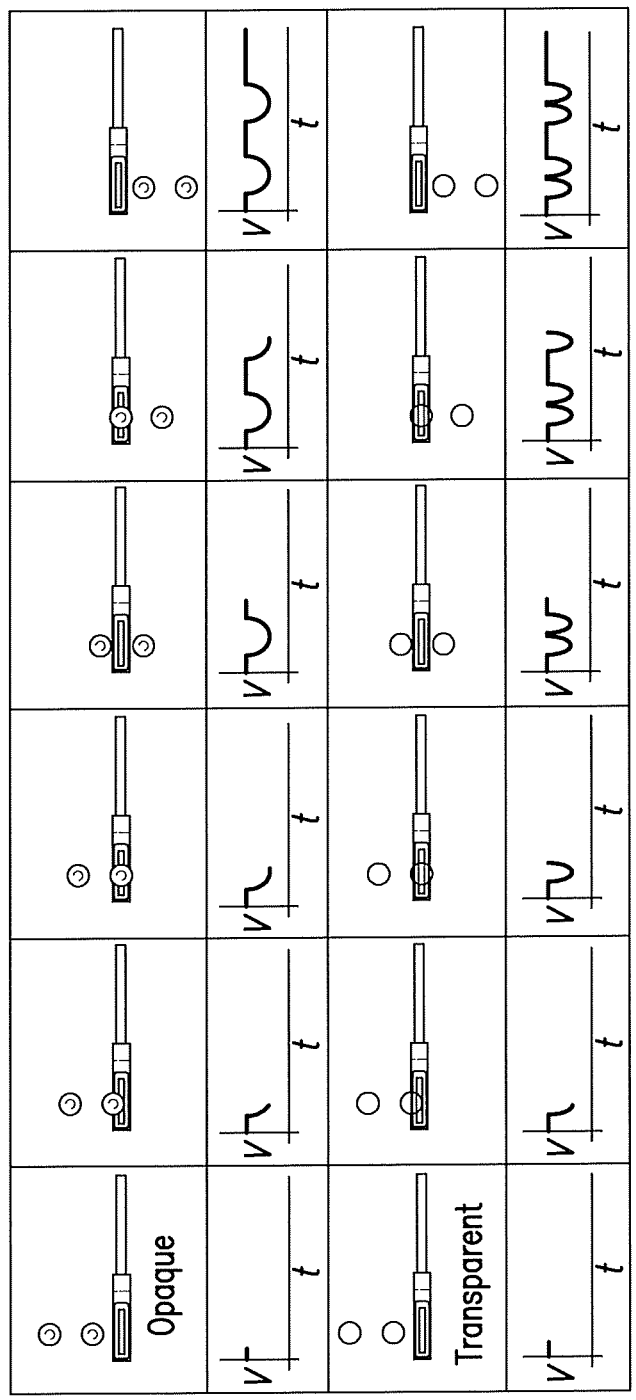
FIG. 7B illustrates the voltage signal profiles of opaque droplets vs. transparent droplets.
Figure 7C:
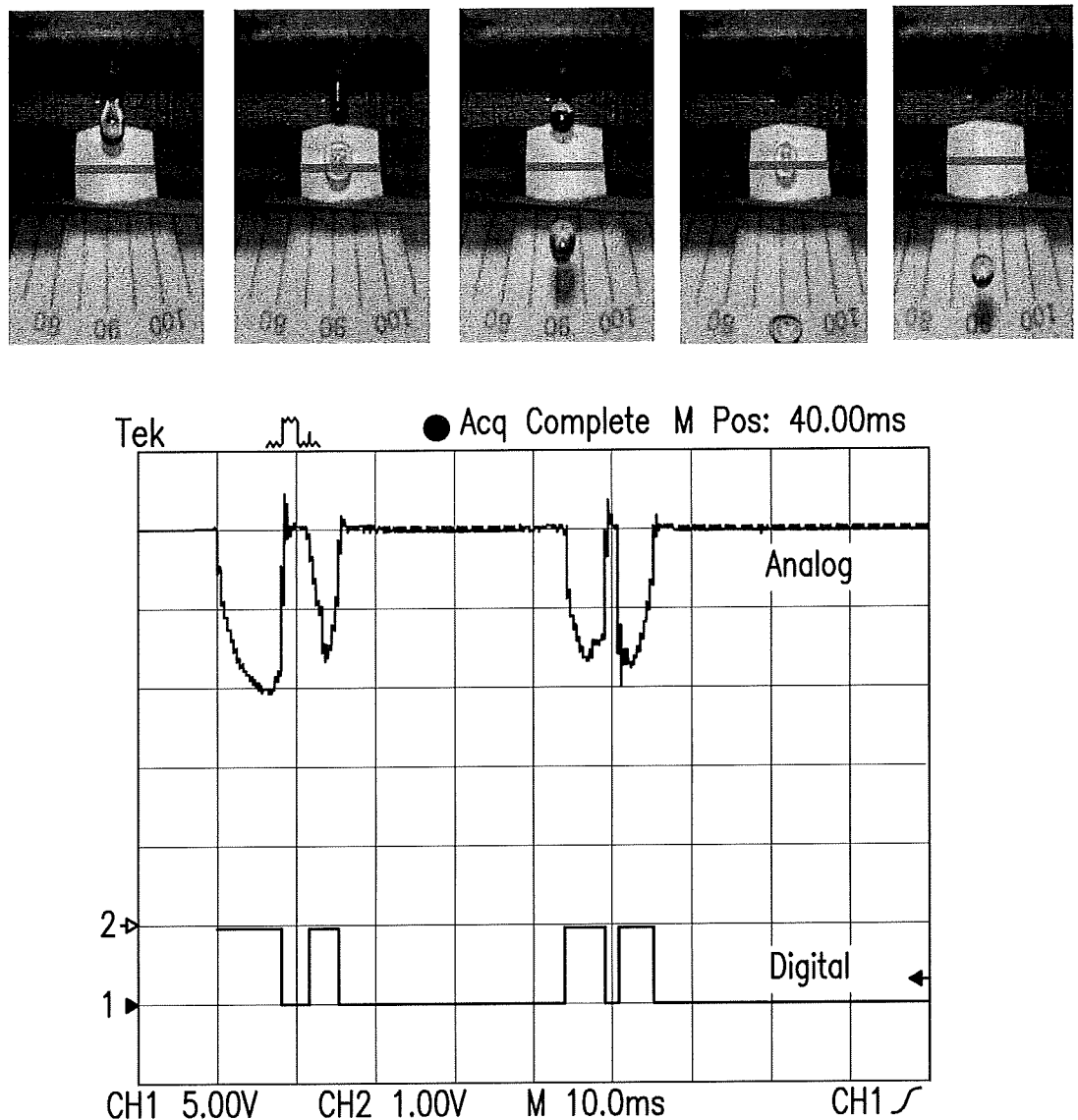
FIG. 7C shows two individual droplets falling through the detection region of a dispense detector, one opaque to the wavelength of light of the emitters and another transparent at the wavelength of light of the emitters.

Next, an image analysis tool was developed to measure the diameter of the dispense for each frame of the high-speed footage in order to compare it with the raw analog signal. Pin gauges were used again as a control dispense. An example of an image analysis tool outputs for a 0.1" pin and Hematoxylin II is shown in FIG. 7A. Comparing the pin to the fluid, it is clear that the fluid is occluding less light for its measured diameter. As shown schematically in FIG. 7B and experimentally in FIG. 7B, as an opaque solid body passes through the sensor array beams, the sensor output will stay proportional to the amount of light being blocked; but when a transparent fluid passes through the beam, the sensor output can spike at seemingly random intervals. These results led to the conclusion that optical lensing and signal spiking from the fluid dispense were occurring because the measured diameter curve does not spike in line with the raw signal. The signal spikes were produced by a lensing effect of the transparent fluid. Each droplet displays the lensing phenomenon. Each transparent droplet shows a "W" shape in the analog signal profile whereas an opaque sphere would have a "U" shape. The middle of the "W" occurs at the moment the droplet is halfway through the sensing area where it acts like a lens and focuses the light from the emitter onto the receiver. This lensing effect is captured in the analog signal profile as a voltage spike in the middle of the expected signal profile.

As used herein, "lensing" or "lensing effect" refers to when the optical geometry of the dispensed fluid is aligned within the sensor pair in such a way that the emitted light is focused through the fluid, like a lens, onto the receiver, instead of blocked, as expected. This means that, momentarily, the fluid passing through the sensor had the potential to focus the light beam onto the receiver and spike the signal instead of blocking the light as expected, which if not compensated for, would affect the signal converted to a diameter using the linear relationship previously established.

One algorithm takes a signal voltage baseline before the dispense signal profile such that the area under the curve is calculated based off of the baseline. For instance, if a clean sensor pair (emitter and receiver) has an average baseline of 5V with no occlusions, then the area between the signal profile and the baseline will be calculated with a proportion of 1. Alternatively, if the sensor pair is dirty, then the baseline maybe lower than the expected 5V. The estimated weight or volume output maintains its integrity via a scaling that is proportional. In addition, tracking of this baseline can be used to signal the user for sensor maintenance.

Figure 8:
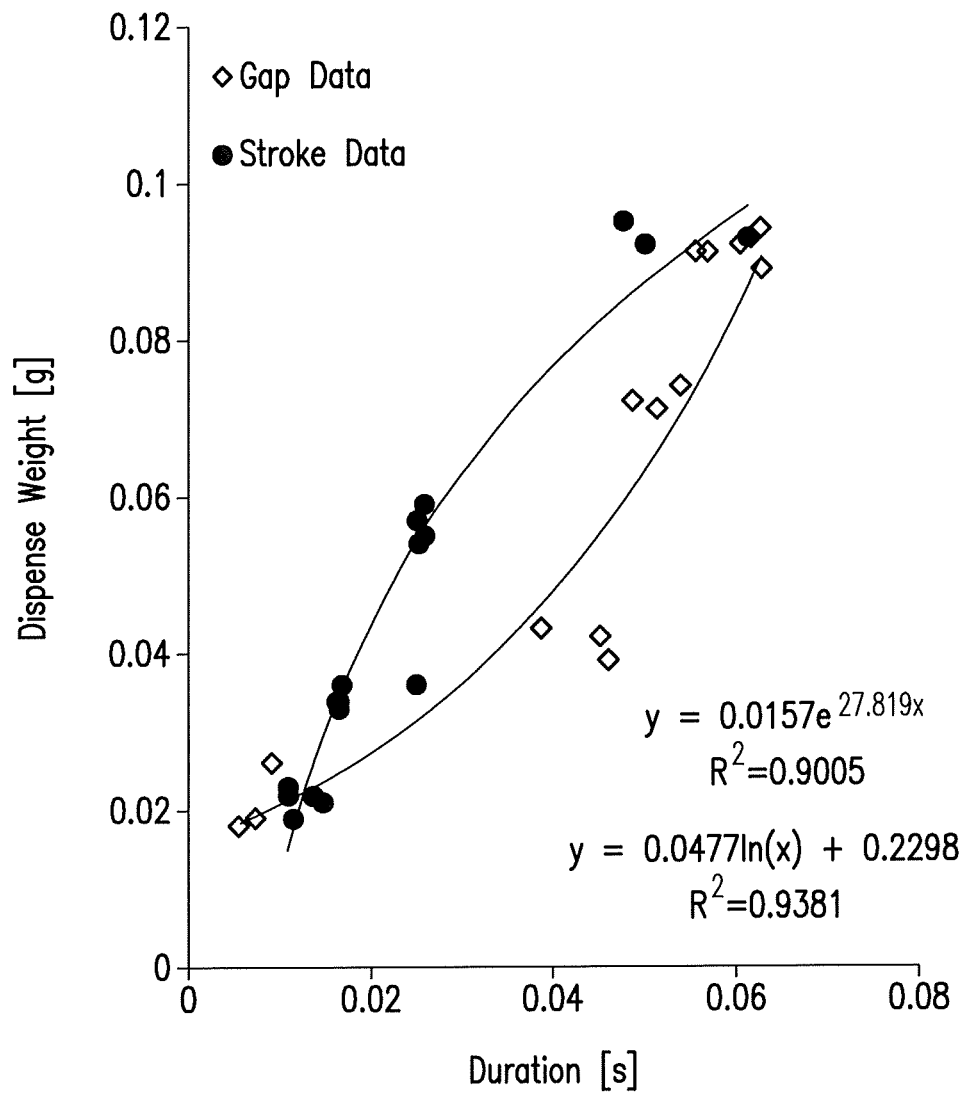
FIG. 8 shows data of the dispensed liquid weight vs. signal duration for the variable volume experiments.

Following the reagent analysis, two more characterization activities were conducted to experiment with dispenses of variable volumes. Different dispense volumes were created by altering the stroke length of a mechanically actuated dispenser. Shortened stroke lengths produce smaller dispenses due to the fundamental displacement properties of the dispenser. The first experiment used custom barrel stoppers to inhibit the stroke length of the dispenser. The second experiment increased the gap between the hammer and the dispenser to produce a shorter stroke. The results of these two experiments are shown in FIG. 8. The custom barrel stoppers show a logarithmic trend whereas the increased gap between the hammer and dispenser shows an exponential trend. Both data sets together formed an envelope representing possible dispense volumes and signal duration combinations.

Figure 9:
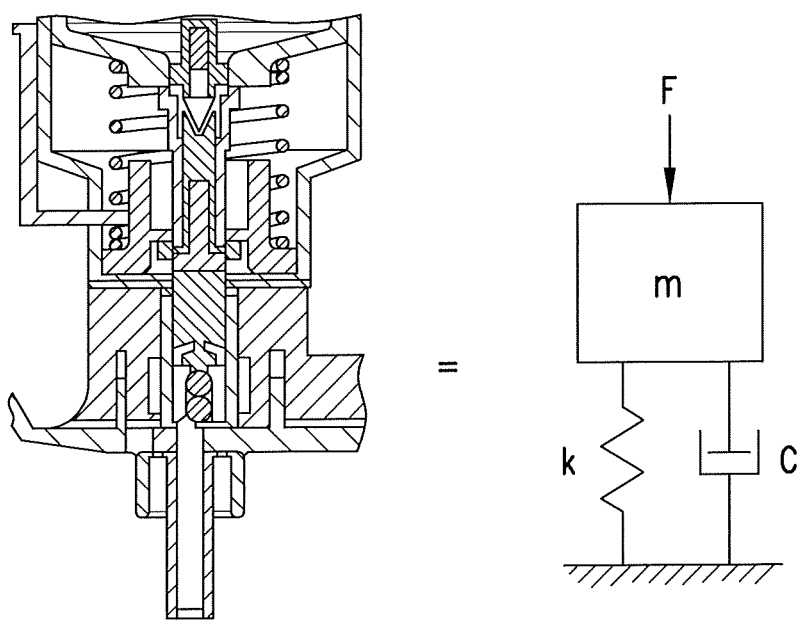
FIG. 9 illustrates a spring and dashpot equivalent model to a particular dispenser system.
Figure 10:
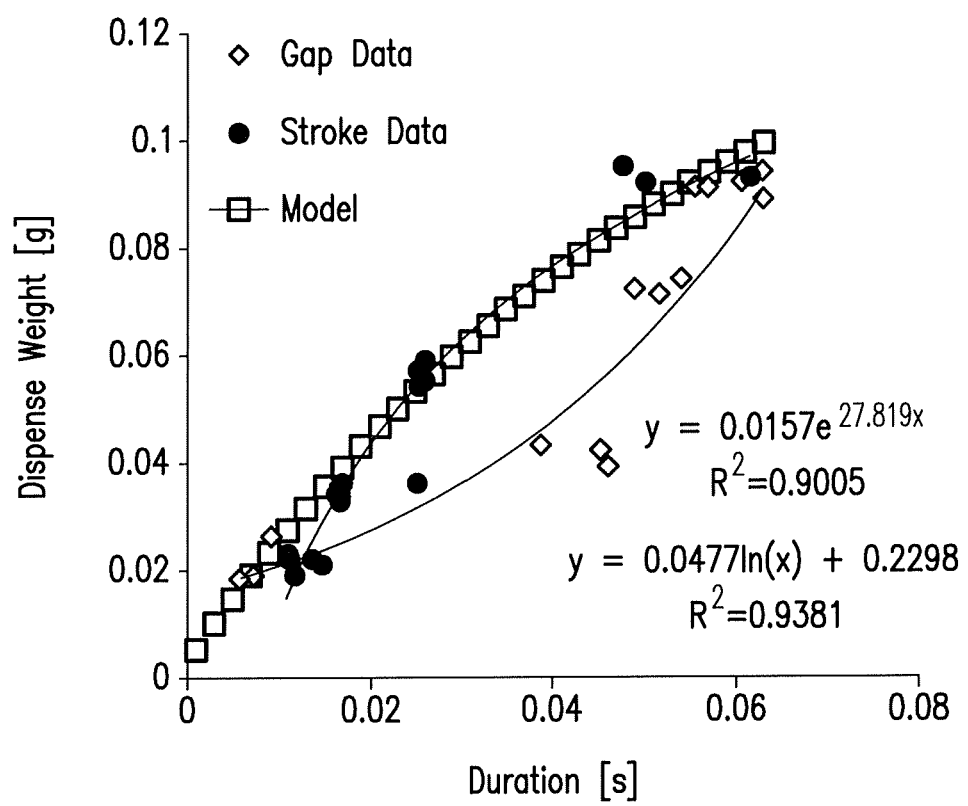
FIG. 10 shows a spring and dashpot model vs. empirical dispenser data.

In one embodiment, a dispenser and hammer on a dispense instrument can be modeled as a spring and dashpot system. As known to one of ordinary skill in the art, a dashpot is a device for damping shock or vibrations. The model was calculated using the equations shown in FIG. 9 with x representing fluid displacement. The motion of the dispenser barrel causes a fluid displacement in the nozzle that is directly related to the dispensed volume. The relationship between the dispensed volume and the signal profile can be traced back to the dispenser motion. As a result, this model was used to generate an expected volume per stroke length to compare with the experimental data. FIG. 10 shows the expected volumes from the model of FIG. 9 alongside the experimental data. It is clear that the model of FIG. 9 exhibits the same logarithmic relationship that was observed with the shortened stroke lengths from the custom barrel stoppers.

Algorithm Development and Signal Processing

In another embodiment, a method for volume estimation involves finding the "area under the curve" for the signal profile. The following are the derived equations.

$$V_{volume} = AL \tag{1}$$

$$L = v\Delta t \tag{2}$$

$$A = \pi r^2 \tag{3}$$

$$r = \frac{d}{2} \tag{4}$$

$$d = C_1 \Delta V_{voltage} + C_2 \tag{5}$$

$$\Delta V_{voltage(i)} = V_{voltage(baseline)} - V_{voltage(i)} \tag{6}$$

-continued $$V_{volume} = \pi\left(\frac{C_1 \Delta V_{voltage} + C_2}{2}\right)^2 v \Delta t \qquad (7)$$

$$V_{volume} = \frac{\pi}{2}\sum_{i=0}^{N}\left[\left(\frac{C_1 \Delta V_{voltage(i+1)} + C_2}{2}\right)^2 + \left(\frac{C_1 \Delta V_{voltage(i)} + C_2}{2}\right)^2\right] * \qquad (8)$$

$$v_i * [t_{(i+1)} - t_{(i)}]$$

The voltage signal can be converted to an instantaneous cross-sectional area, A, based on the relationship between the voltage, V, the diameter, d, and the geometric relationships shown in equations 3-6, above. The volume can be calculated by using the calculated area in equation 1 and multiplying by the velocity as a function of time, v, and the change in time, Δt, as shown in equation 7. A definite integral is approximated using numerical techniques, yielding equation 8. In one embodiment, a fixed velocity is used, which is based off of the high-speed camera footage, however, a second sensor positioned in series with the first sensor allows for velocity capture. Measured velocity information can be used to generate estimated velocity profiles of the dispensing event. This velocity profile information can be used inside the summation in equation (8) to substantially improve the volume estimation per dispense.

For example, in two point velocity, the data capture yields an initial velocity and the final velocity with the use of a minimum with two sensors. A two point interpolation can yield a straight line equation for velocity as a function of time with the slope of (Vo−Vf)/(tf−to) and y-intercept of Vo. In addition, by using existing signal patterns from the two signal profiles from each sensor set, a velocity profile as a function of time can be estimated between the beginning and end of the dispensing event. This velocity (t) array is applied mathematically inside of the volume integration's numerical summation equation per integration step.

As an example of a three-point velocity equation, the geometric center of area for each time signal can be found. Since both signals share the same time line, the time shift between each center of geometry can be used to calculate a velocity in the middle of the signal and could be called Vm. The three points can be interpolated for a signal profile of velocity as a function of time. As another example, if multiple patterns are collated between the two captured signals, then a multiple of velocity points can be collected. These velocity points can be interpolated to create a completed velocity profile or a velocity as a function of time for three or more points.

In contrast, when using only one sensor array, the velocity parameter is determined algebraically to the outside of the integration summation and multiplied only once by the completed summation since the velocity profile is assumed flat or best empirical average. In certain embodiments, two sensor arrays are better than one since the velocity profile is more complete. Data from two or more sensor arrays combined with fluid dynamic modeling may yield even better velocity estimations for each portion of a dispensing event, thereby increasing the accuracy of the method even further.

Figure 11A:
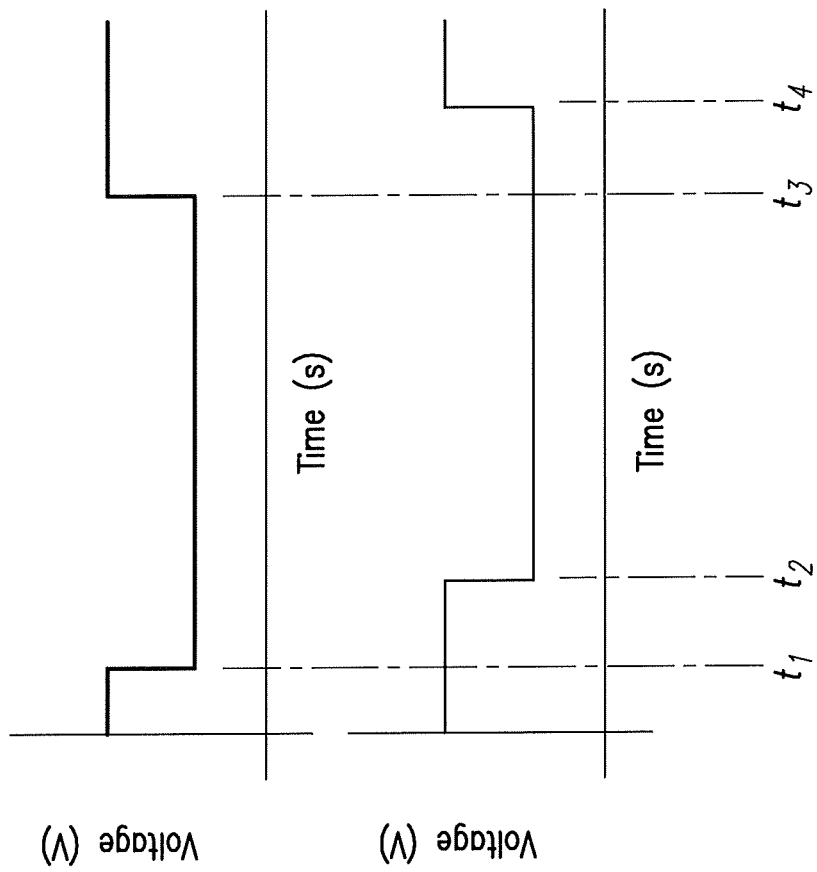
FIG. 11A illustrates an exemplary configuration of a second emitter/receiver pair positioned in series with a first emitter/receiver pair and how velocity can be calculated for an object passing through the dispense detector when 2 arrays are present.

As shown in FIG. 11A, two sensor pairs (emitter and receiver) are used to capture the velocity of the dispensing based on the offset of their outputs. For illustrative purposes, one side of the sensing area can have emitter #1 positioned on top of receiver #2. The other side can have receiver #1 on top of emitter #2. This is an attempt to avoid "cross-talking" between sensors by configuring the emitters to face each other, thereby minimizing the amount of light transmitted from emitter #1 to receiver #2 and vice-versa. It is to be understood that other configurations are possible.

Figure 11B:
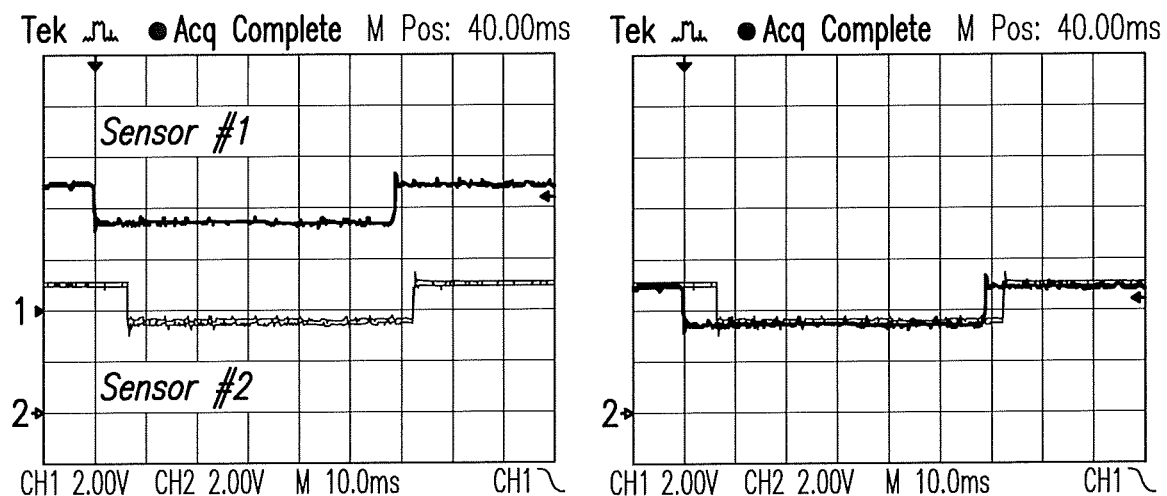
FIG. 11B shows an exemplary voltage signal profile for a pin gauge falling through the detection region formed by two emitter/receiver pairs in series.
Figure 11C:
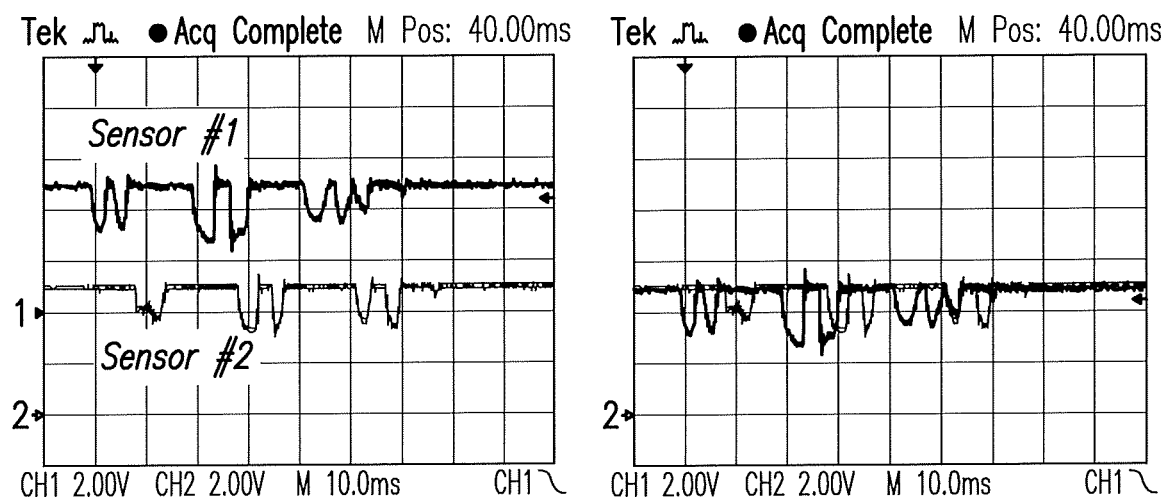
FIG. 11C shows an exemplary voltage signal profile for a dispensed liquid falling through the detection region formed by two emitter/receiver pairs in series.

As shown in FIGS. 11B and 11C, the signal profile captured by the second sensor pair is offset from the signal profile captured by the first sensor pair, and has a slightly shorter duration due to the increase in velocity caused by acceleration from gravity. The fluid dispense signal profile shape is slightly different between sensor pairs because the falling droplets are morphing blobs.

In preferred embodiments, the two sensor configuration can screen for a good or poor dispense. Changes from one sensor to the next sensor together with the initial velocity and signal duration captured, such as the average velocity and the second final velocities, are useful information for describing the eject-falling dynamics of a dispense or the quality of the dispense. For example, any deviations from an expected change in velocities, signal durations, or ratios thereof between the two sensors can indicate a questionable dispense. The two sensor configuration can determine key relationships of velocity and signal duration with respect to initial and final measurements that give equation models for their respective differences and ratios, which can be used to proportionally scale the velocity used on a per dispense basis. Additionally, algorithms for the two sensors, such as computational and logical decisions, enable a flag for deficiencies related to poor dispense performance.

Figure 12:
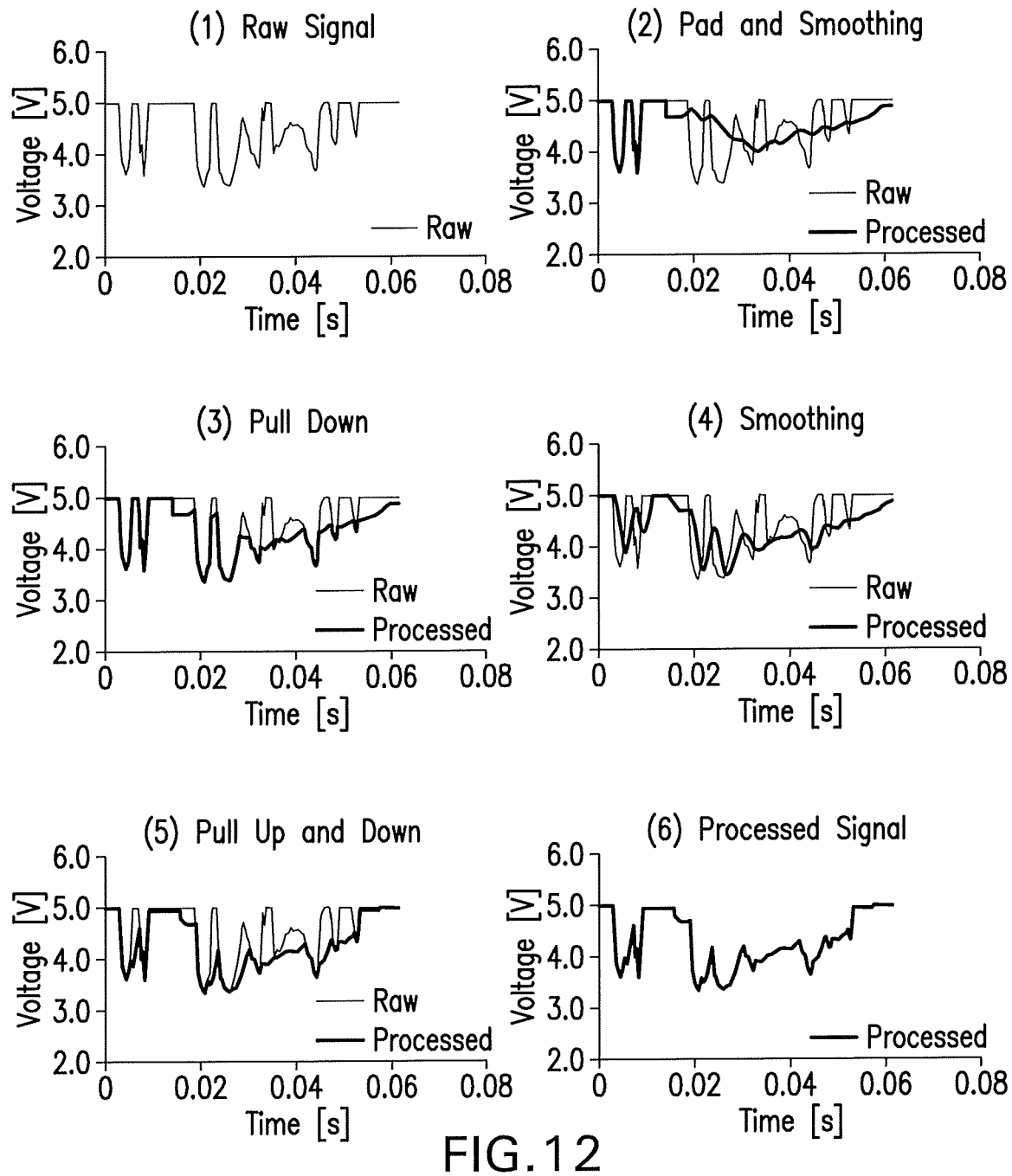
FIG. 12 depicts the performance of several disclosed signal processing procedures compared to measured liquid masses (related to volume through density).

As previously discussed, the lensing effect can change the signal profile shape, which can affect the accuracy of the integration method. In order to remove the lensing effect due to transparent droplets, the signal is adjusted through a signal processing algorithm to extract an estimated geometry per time signal profile used for the integration method. FIG. 12 shows an iterative method for signal processing that was developed based on the analysis of the high-speed footage. This algorithm is used to manipulate the analog signal profile into a better representation of the dispense diameter. This signal processing technique accommodates for the unwanted signal spikes due to the fluid optics and allows for more accurate volume estimation from the numerical integration. In the first step, the raw signal is padded and smoothed by passing it through a low-pass filter. The smoothed signal is then pulled down to the original signal, comprising setting each point in the pulled down signal to the minimum of the smoothed signal and the raw signal. The pulled down signal is then smoothed a second time by passing it through a second low pass filter, to produce a second smoothed signal. The second smoothed signal is then pulled down a second time and pulled up, comprising setting the output signal to the minimum of the second smoothed signal and the raw signal and pulling up to the baseline for characterized gaps in the signal, thereby removing optical lensing effects. The output is the processed signal. In other embodiments, the signal processing steps can be repeated n-times to shape the final signal. Typically, n is optimized to minimize a difference between the estimated volume and a known volume of the dispensing event.

Figure 13:
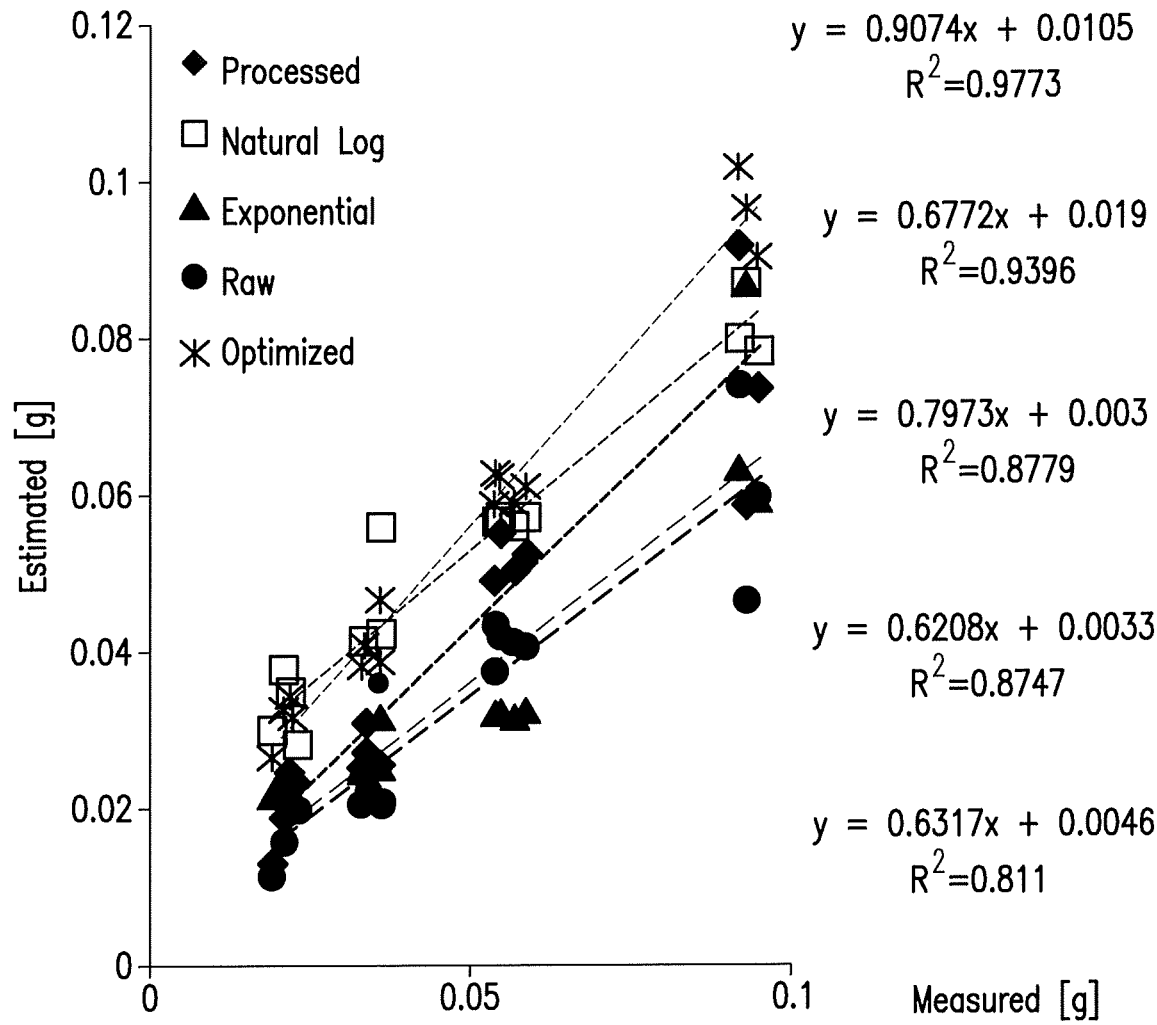
FIG. 13 shows a comparison of the errors associated with a disclosed algorithmic volume estimation method in comparison to the identity of the liquid.

Initially, four independent methods for estimating the dispense volume where attempted: (1) Integration of Raw Signal; (2) Integration of Processed Signal; (3) Signal Duration with Natural Log (dispenser stroke length); and (4) Signal Duration with Exponential (hammer position). The four methods were implemented on a data set of 18 dispenses to show the feasibility of a dispense detection system with a volume output. An algorithm that weights these four methods against each other via logic and data analysis to produce the best possible volume estimation was created as the fifth data set "Optimized." The performance results for the four independent methods to estimate volume, and a fifth, combined method, are shown FIG. 13. The linear fit of the four independent methods show a good correlation ($R^2>0.8$) within their data set and the fifth method is at nearly a 1:1 ratio between the estimated and actual volumes. In one embodiment, further tuning of the algorithm can achieve better accuracy. In another embodiment, the use of two sensors can achieve even better accuracy by optimizing and making more robust measurements with respect to the dispense velocity.

Figure 14:
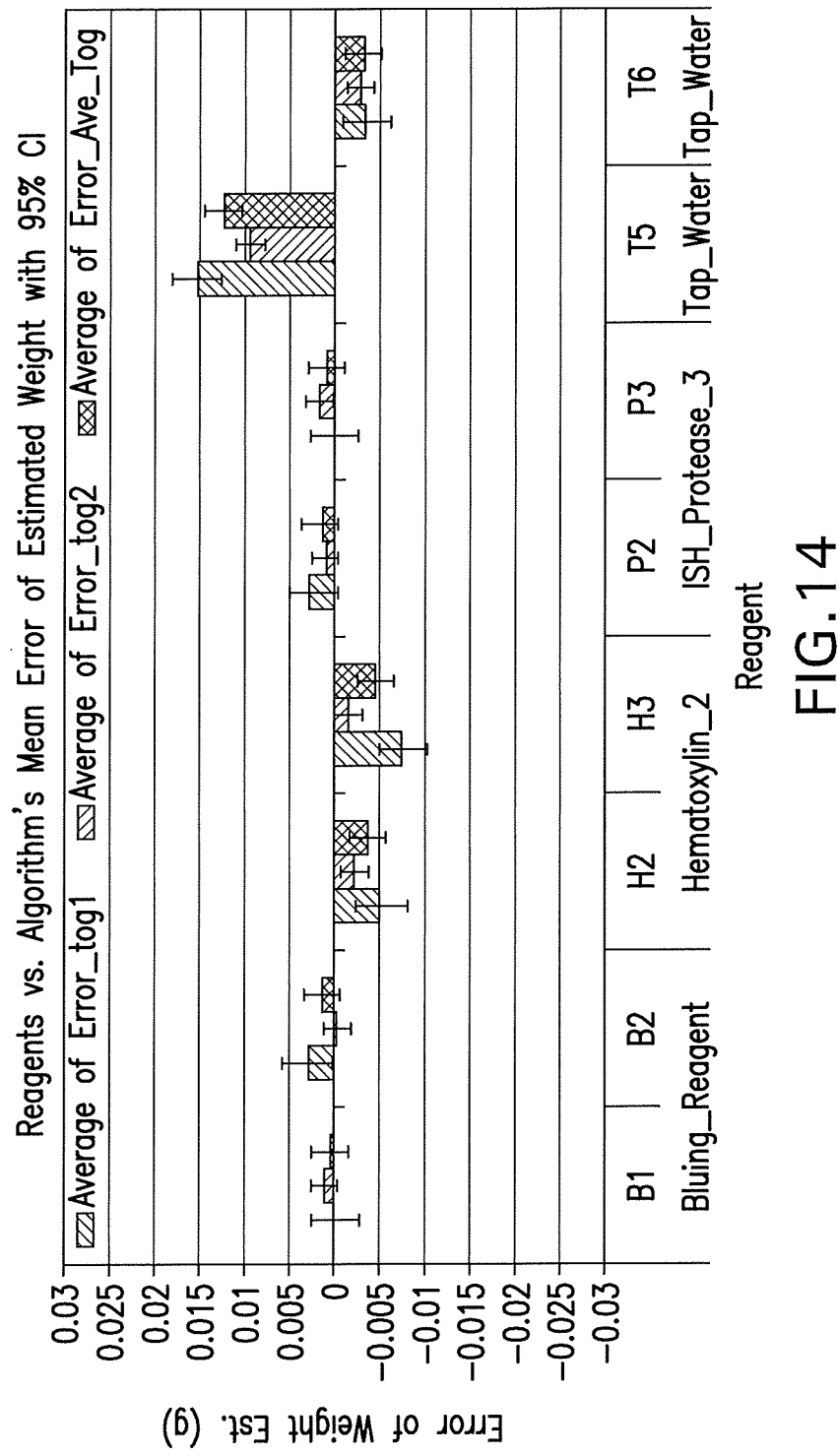
FIG. 14 shows early estimated volume error performance across multiple reagents.

As shown in FIG. 14, the test bed collected dispense data across multiple reagents (Hematoxylin II, ISH Protease 3, Bluing Reagent, Tap water) selected for their contrasting fluid properties. Early results indicated an estimate accuracy of ±10 milligrams of the true full normal dispense volume, which was about 95 mg of tap water for a normal dispense for a data set of 38 dispenses. The large difference in tap water data is a result from two different configurations. Tap water data was collected twice with a refillable dispenser. The refillable dispenser has a cap on the top that can affect the gap between the dispenser and the hammer. It is possible that this change in gap height may have produced the larger errors shown for the first tap water data set due to unconventional signal durations and fluid velocities. In some embodiments, the use of two sensor pairs would be able to account changes in gap distances, thereby minimizing errors.

The terminology 'tog1' and 'tog2' stand for 'Together' or 'Tog' for short to name the combined algorithms. Two weighted combinations were tested in which 'Tog1' weight signal processing higher than the other functions. Second, 'Tog2', was weighted much higher for signal duration and tested. In total, four methods were initially identified for estimating the dispense volume: (1) Integration of Raw Signal; (2) Integration of Processed Signal; (3) Signal Duration with Natural Log (dispenser stroke length); and (4) Signal Duration with Exponential (hammer position). An optimal algorithm to combine all four methods was created. The four independent methods combined and weighted to now create fifth optimized method called 'Tog.' The following are non-limiting examples of optimization formulations:

Coefficients for tog1: (Ai=0.51; Bi=0.38; Ci=0.38; Di=0;),

Ai*Sig_Proc+Bi*ln(Sig_Dur)+Ci*exp(Sig_Dur)+Di*(Sig_Raw)

$$\text{Minimize } F(X), [X]: \sqrt{\frac{\sum_{i=0}^{n=38}(\text{abs}(tog1(X)_i - \text{actual}_i))^2}{n}}$$

Subject to:
no constraints
· Coefficients for tog2: (Aj=0.1502; Bj=0.7010; Cj=0.1423; Dj=0;)

Aj*Sig_Proc+Bj*ln(Sig_Dur)+Cj*exp (Sig_Dur)+Dj*(Sig_Raw)

$$\text{Minimize } F(X), [X]: \sqrt{\frac{\sum_{j=0}^{n=38}(\text{abs}(tog2(X)_j - \text{actual}_j))^2}{n}}$$

Subject to:
$A_j+B_j+C_j+D_j=1$

Excel Generalized Reduced Gradient (GRG2) Algorithm was used for optimizing the nonlinear problems shown above. The main difference in the two optimization schemes were the constraints in which 'Tog2' was limited to the sum of the coefficients to equal 1, while 'Tog1' did not have such a constraint. The objective functions, F(X) were both the same. They were based on minimizing the standard deviation of the absolute value of the difference between the actual weights of each of the 38 dispenses and 'Togs' estimated weights. 'Tog2' performs quite well, however 'Tog1' might be more robust for bad dispenses since 'Tog1' significantly weights higher the calculations for volume by numerical integration, i.e. Ai>Aj; whereas 'Tog2' is weighted towards using only the signal duration (Bj and Cj), which could be skewed since the signal duration method will be poor at estimating volumes of other geometries as illustrated in FIG. 6B. For instance, the signal duration method would over-estimate the volume of a thin dispensing event profile, or under-estimate the volume for a wide dispensing event profile. Moreover, the signal duration method would not be able to account for necking in the dispensing event profile or the existence of individual, separated droplets.

Figure 15:
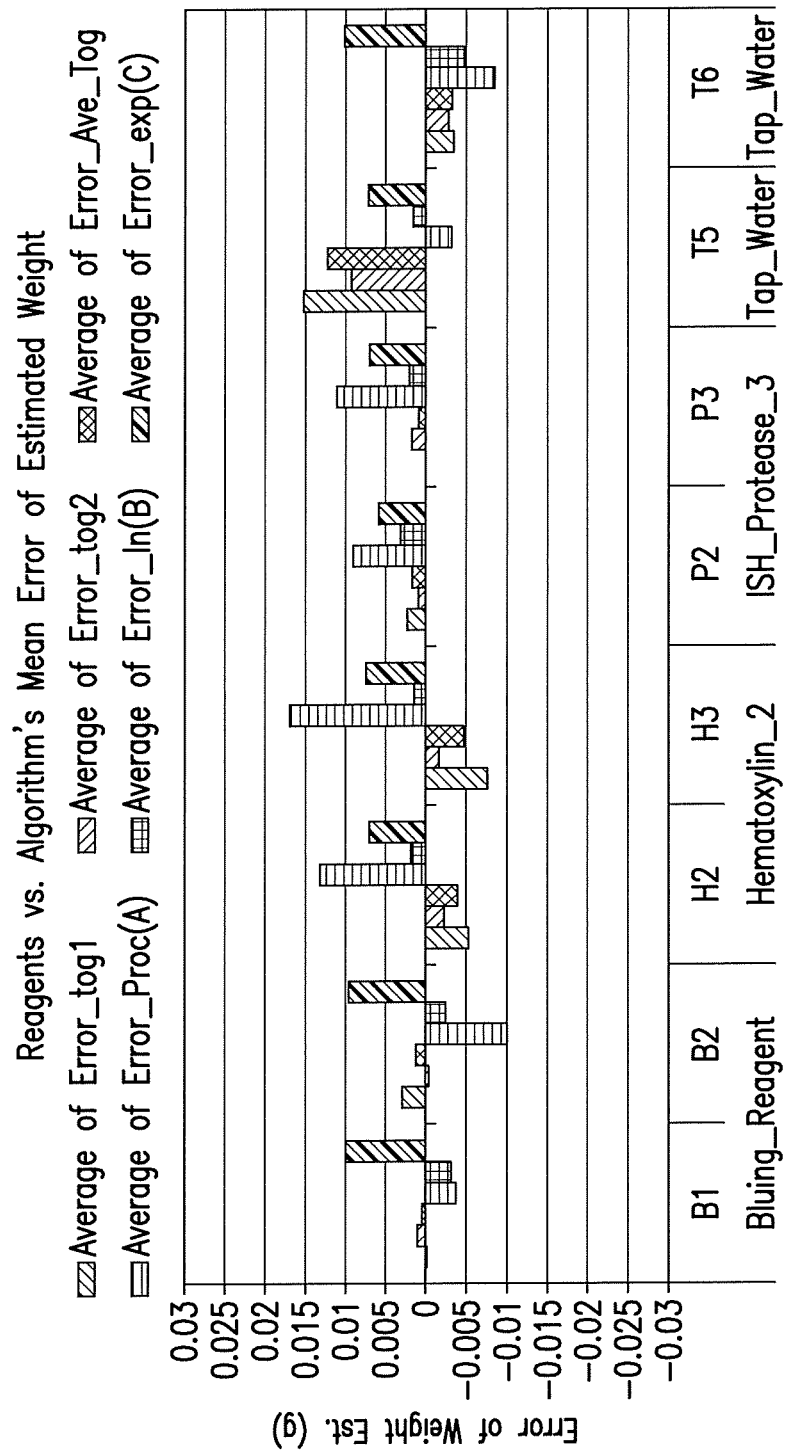
FIG. 15 shows a comparison of average errors for other embodiments of disclosed volume estimation algorithms across different liquid reagent types.

FIG. 15 shows the average error for the three main volume estimation algorithms alongside the weighted 'tog's. The data set of 38 dispenses is comprised of normal dispenses. As shown in the graph, the natural log algorithm is the most accurate for this data set. This is because natural dispenses follow the system model very well. However, this method is strictly limited to signal duration analysis, leaving it prone to errors when the dispensing event is not as expected. On the other hand, other algorithms should perform better for abnormal dispenses. Overall, the weighted 'tog' algorithms will accommodate most dispense scenarios. As a result, it is determined that estimated volumes have been identified to be within ±10 milligrams to the known weights of each full normal dispense. Better accuracy can be achieved by finer tuning of the algorithm, and/or an additional sensor for velocity capture, in particular, for different fluid types and fluid viscosities. Further, the disclosed system and method could identify abnormal dispense characteristics.

Three major improvements were then made: a double sensor pair in tandem and parallel was designed to measure dispense velocities real-time, a different electromagnetic wavelength that has the appropriate absorption for aqueous reagents was selected, and different algorithm was designed that could provide dispense object renderings real-time (dispense geometry, size, and channel 1&2 object pairing of said objects to improve velocity measurements). See FIG. 23 below). Based upon Joseph A. Curcio and Charles C. Petty, "The Near Infrared Absorption Spectrum of Liquid Water," J. Opt. Soc. Am. 41, 302-304 (1951), sensor arrays operating at approximately 1480 nm infrared wavelength, where substantial absorption for water at about the diameter of the dispense geometry of interest was indicated, were identified as desirable for the disclosed system.

A simulation of the behavior expected at 1480 nm, food dye coloring (dark blue) was utilized with red light double sensor pairs in tandem and parallel in order to demonstrate that with sufficient absorption an improved new algorithm and setup would perform robustly. The improved volume estimation algorithm is explained in a step by step process with reference to FIGS. 16A, 16B and 16C. In step 1, the raw signal is captured. In step 2, the baseline of the signal is identified, and since the baseline has a lower signal to noise ratio, the baseline can be removed using a noise cutoff as shown in step 3. In step for, an optional conversion to voltage change is shown, which helps one to visualize how the area under the curve, which relates to volume, is obtained. In step 5, a Reimann sum is calculated for the signal, which amounts to summing up the area under the curve (a form of numerical integration). Because areas of the signal profile where there is no area under the curve (because presumably there is no signal) do not contribute to the Reimann sum, portions of the profile that are not representative of an object are identified as potential "anti-objects" as shown in step 6. As shown in step 7, the beginning and end of each anti-object is assigned, and in step 8, true anti-objects are identified by filtering out gaps of less than a pre-determined minimum gap duration between objects. Finally, in FIG. 16A, at step 9, the dispense objects are located within the dispensing event profile.

Figure 16A:
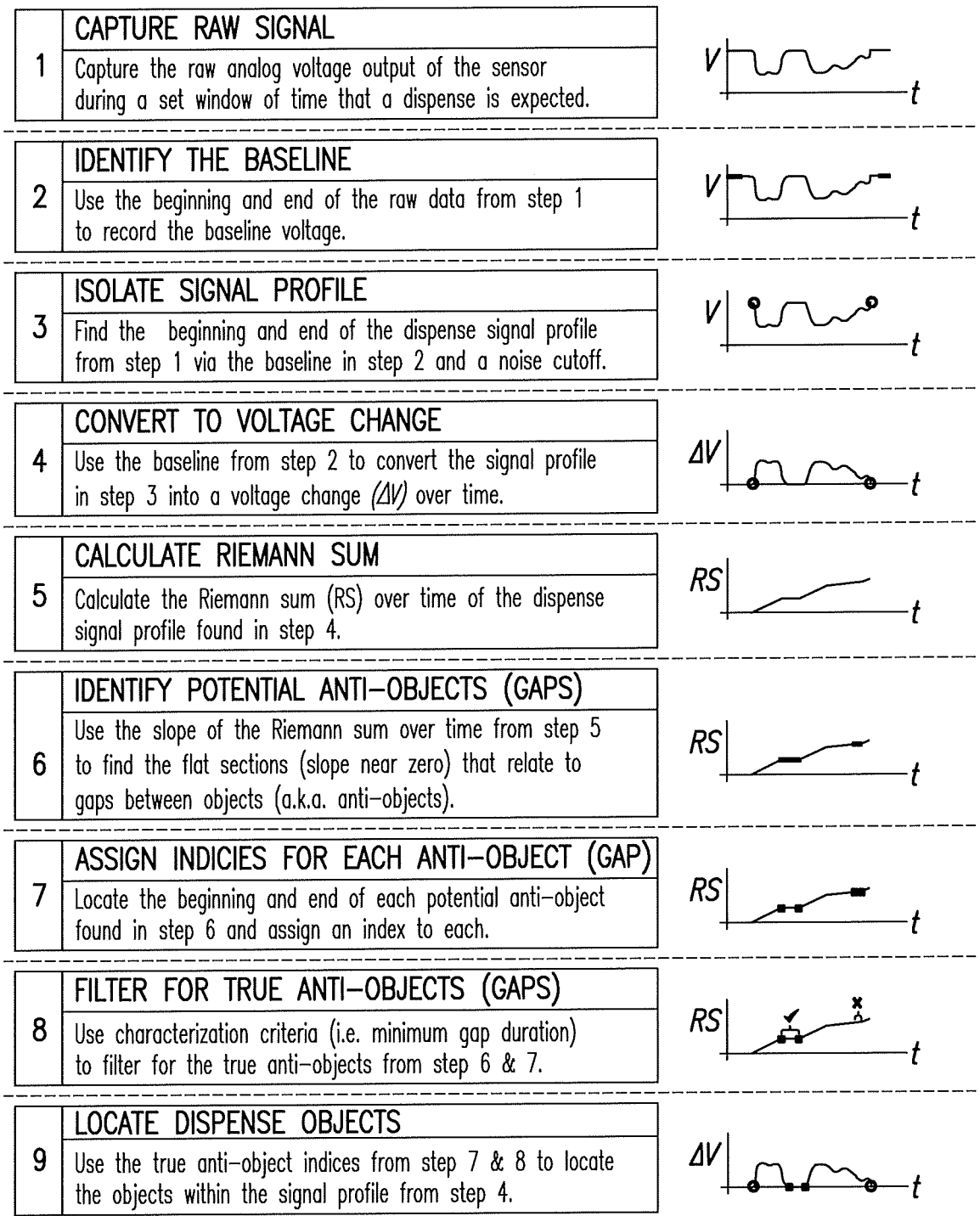
FIG. 16A shows another embodiment of disclosed algorithm for volume estimation.
Figure 16B:
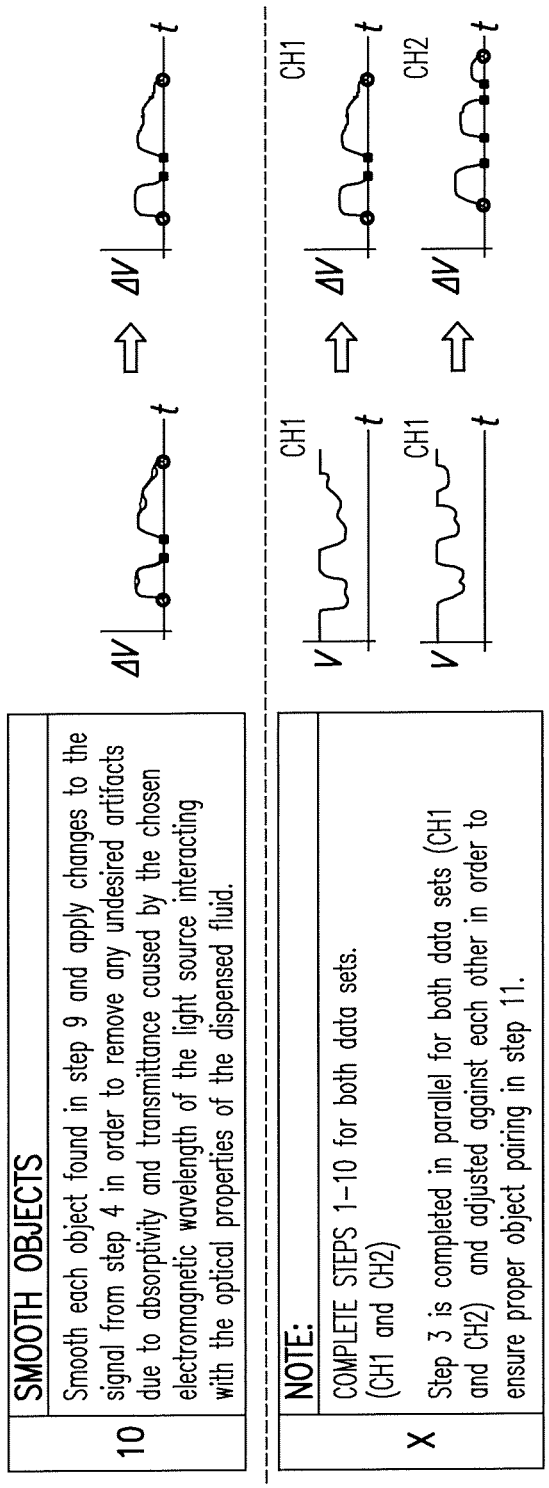
FIG. 16B is a continuation of steps from FIG. 16A for another embodiment of a disclosed algorithm for volume estimation.

Moving now to FIG. 16B, which is a continuation of FIG. 16A, an optional smoothing step can be added to remove optical artifacts such as lensing from the dispensing event profile. As shown in step X, the preceding steps can be repeated for the signal from additional arrays that are part of a dispense detector.

As shown in FIG. 16C, which is a continuation of FIG. 16A and FIG. 16B, step 11 is an object pairing step that seeks to harmonize the profiles of the different sensor arrays. In the illustrative example, the dispensing event passes through a first sensor array as 2 objects, however by the time the dispensing event reaches the second sensor array, it has split into 3 objects (such as can happen upon droplet formation). The algorithm then pairs the first of two objects reaching the second sensor array with the first object observed in the first sensor array and pairs the last two objects reaching the second array with the second object observed in the first sensor array. In step 12, velocity profiles for the objects are calculated for the "two" objects passing through the dispense detector, and these velocity profiles (which are observed to be changing over time) are used to calculate the volume estimate as shown in step 13. Since the voltage change of the sensors is proportional to the diameter of a dispensing object, the volume estimate is given by the equation associated with step 13.

In FIG. 17, a comparison is made between the different algorithms. Currently, it is common to simply record the time for the dispense several times and correlate these times to the volume output as a model, however, as shown below, such prior art methods can be very erroneous when challenged, even though they can be very accurate for very repeatable systems. In FIG. 17, these simple methods are shown as algorithms A1, A2, B1, and B2, where A1 and A2 are based on the signals from a first and second sensor array, respectively, and the same applies to B1 and B2. Embodiments of the disclosed method are shown as C1, C2, D, and E, where C1 and C2 again refer to treating the signals from a first and second array separately.

Figure 18:
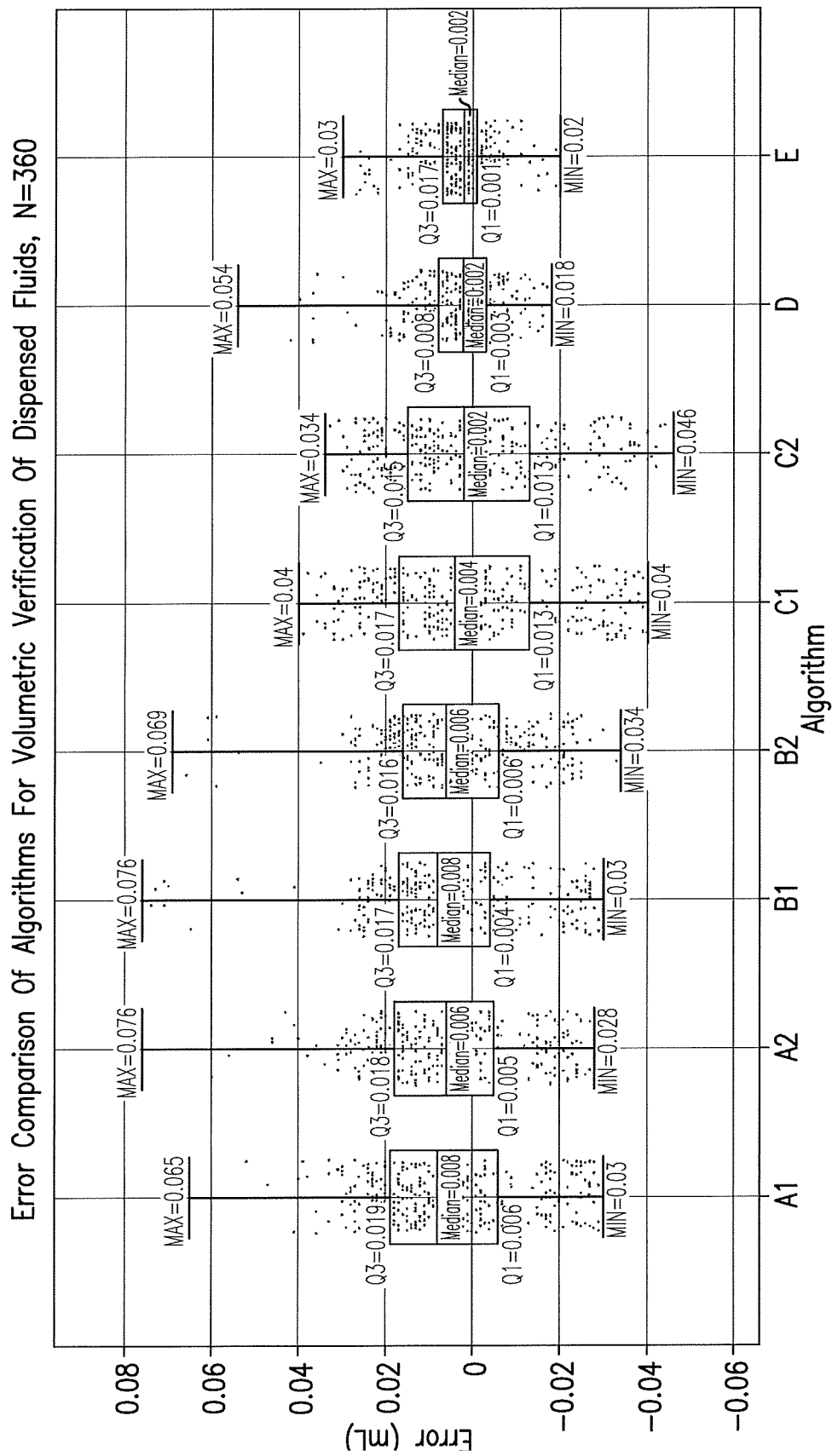
FIG. 18 shows comparative errors for the different algorithms for volume estimation shown in FIG. 17.

FIG. 18 shows the associated errors for each of the methods A1, A2, B1, B2, C1, C2, D and E as determined in a robustness study. The study varied dispense volume (24 µL to 115 µL), the dispense system's pressure (affecting dispense velocity from 9 PSI to 25.4 PSI), viscosity (Tap water versus more viscous reagent ISH Protease 3, both dyed dark blue with food color), and the gap distance between the dispense systems pneumatic hammer and the dispenser (gap versus no gap). A characterization set of n=179 was collected in order to correlated results of each algorithm and is shown in the FIG. 18.

In methods C1 and C2, a stored (such as empirically determined velocity obtained from a high speed camera analysis) is used for each dispense object. In D, an average velocity for the dispense objects to pass between the first sensor array and the second sensor array is determined from the sensor signals in real time, and this is shown to improve the accuracy to some degree. As can be seen, algorithm E, which includes determining velocity profiles for different objects of dispense events, is the most accurate (lowest error). Methods strictly limited to signal duration analysis leave it prone to errors when the dispensing is not of a type that is expected.

In order to show that the performance above was not because of correlating the data to the set itself, a larger independent robustness study was constructed with new data, N=360. As mentioned for the characterization study, in order to stress the dispense verification system, the project designed a robustness study that would vary volume (24 µL to 115 µL), the dispense system's pressure (affecting dispense velocity from 9 PSI to 25.4 PSI), viscosity (Tap water versus a more viscous ISH Protease 3 solution, both dyed dark blue with food color), and vary the gap distance between the dispense systems pneumatic hammer and the dispenser (gap versus no gap). Again, algorithm (E) provides real-time feedback including detection, volume estimation, velocity profiles, and poor trajectory identification (discussed in the following section). This system has been tested against 800 fluid dispenses with 100% accuracy in detection. Accuracy robustness assessment of 360 samples as shown above for Algorithm (E) has a low volume estimation error of ±16 µL (95% CI) for Div1, ±17 µL (95% CI) for Div5, ±18 µL (95% CI) for Div10 which is approximately 200% improvement from current 'state of art' algorithms or time correlations (event driven or entire signal durations).

The examples above show how the algorithm has a robust ability to pair dispense objects and yield velocity profiles that can be used in the numerical integration algorithm (E). The code used for the algorithm can be embedded into a simple micro-processor that can be part of a stand-alone dispense detection system as disclosed herein.

The benefits of screening Pass/Fail dispenses have the potential to go beyond dispenser quality control. For example, the volume estimation capability can provide a tool for troubleshooting and assay development. Dispense detection can help ensure positive reagent delivery for every dispensing event in a given analysis of a biological sample. A preliminary analysis was done to assess performance across different trajectories and the screening capabilities of the sensors were assessed. The all-inclusive conclusion for 'How' dispense detection works for primary 'Absence vs Presence,' the advance method of 'Volume Estimation' and the goal of assessing 'Did it hit the Slide' comes together as a complete solution for dispense verification.

Real time dispense volume measurement data may be stored and collated with the slide specimen's identifier, and each dispenser's identifier affiliated with delivery of reagents to said specimen. This meta data may be stored onboard the instrument or host computer for tracking and reporting purposes in the histology lab. Dispense volume meta data can be tracked for the entire slide staining process history. In addition, continuous performance tracking per dispenser's identifier can be collected during its lifecycle. For a given 'poor dispense', the failed dispenser and affected specimen may be flagged, such as by software, and reported to the histologist through several electronic methods (i.e. led indicator, run report, etc.) to increase patient safety. Dispense volume meta data may be collected into external data banks for research and development purposes. This data could be used to qualify and screen new staining kits, or individual staining products. In addition, dispense verification tracking can be used in newly developed reagents that may perform differently over time and affect the dispense delivery of the reagent to the specimen slide (i.e. material compatibility with reagent and dispenser). Overall, the disclosed system and method offer an improvement to the development, quality, and patient safety processes involved within the tissue staining industry.

System Computer Environments

Computers typically include known components, such as a processor, an operating system, system memory, memory storage devices, input-output controllers, input-output devices, and display devices. It will also be understood by those of ordinary skill in the relevant art that there are many possible configurations and components of a computer and may also include cache memory, a data backup unit, and many other devices. Examples of input devices include a keyboard, a cursor control device (e.g., a mouse), a microphone, a scanner, and so forth. Examples of output devices include a display device (e.g., a monitor or projector), speakers, a printer, a network card, and so forth. Display devices may include display devices that provide visual information, this information typically may be logically and/or physically organized as an array of pixels. An interface controller may also be included that may comprise any of a variety of known or future software programs for providing input and output interfaces. For example, interfaces may include what are generally referred to as "Graphical User Interfaces" (often referred to as GUI's) that provides one or more graphical representations to a user. Interfaces are typically enabled to accept user inputs using means of selection or input known to those of ordinary skill in the related art. The interface may also be a touch screen device. In the same or alternative embodiments, applications on a computer may employ an interface that includes what are referred to as "command line interfaces" (often referred to as CLI's). CLI's typically provide a text based interaction between an application and a user. Typically, command line interfaces present output and receive input as lines of text through display devices. For example, some implementations may include what are referred to as a "shell" such as Unix Shells known to those of ordinary skill in the related art, or Microsoft Windows Powershell that employs object-oriented type programming architectures such as the Microsoft .NET framework.

Interfaces may include one or more GUI's, CLI's or a combination thereof. A processor may include a commercially available processor such as a Celeron, Core, or Pentium processor made by Intel Corporation, a SPARC processor made by Sun Microsystems, an Athlon, Sempron, Phenom, or Opteron processor made by AMD Corporation, or it may be one of other processors that are or will become available. Some embodiments of a processor may include what is referred to as multi-core processor and/or be enabled to employ parallel processing technology in a single or multi-core configuration. For example, a multi-core architecture typically comprises two or more processor "execution cores." In the present example, each execution core may perform as an independent processor that enables parallel execution of multiple threads. In addition, those of ordinary skill in the related will appreciate that a processor may be configured in what is generally referred to as 32 or 64 bit architectures, or other architectural configurations now known or that may be developed in the future.

A processor typically executes an operating system, which may be, for example, a Windows type operating system from the Microsoft Corporation; the Mac OS X operating system from Apple Computer Corp.; a Unix or Linux-type operating system available from many vendors or what is referred to as an open source; another or a future operating system; or some combination thereof. An operating system interfaces with firmware and hardware in a well-known manner, and facilitates the processor in coordinating and executing the functions of various computer programs that may be written in a variety of programming languages. An operating system, typically in cooperation with a processor, coordinates and executes functions of the other components of a computer. An operating system also provides scheduling, input-output control, file and data management, memory management, and communication control and related services, all in accordance with known techniques.

System memory may include any of a variety of known or future memory storage devices that can be used to store the desired information and that can be accessed by a computer. Computer readable storage media may include volatile and non-volatile, removable, and non-removable media implemented in any method or technology for storage of information such as computer readable instructions, data structures, program modules, or other data. Examples include any commonly available random access memory (RAM), read-only memory (ROM), electronically erasable programmable read-only memory (EEPROM), digital versatile disks (DVD), magnetic media, such as a resident hard disk or tape, an optical medium such as a read and write compact disc, or other memory storage device. Memory storage devices may include any of a variety of known or future devices, including a compact disk drive, a tape drive, a removable hard disk drive, USB or flash drive, or a diskette drive. Such types of memory storage devices typically read from, and/or write to, a program storage medium such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with memory storage device. In some embodiments, a computer program product is described comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Input-output controllers could include any of a variety of known devices for accepting and processing information from a user, whether a human or a machine, whether local or remote. Such devices include, for example, modem cards, wireless cards, network interface cards, sound cards, or other types of controllers for any of a variety of known input devices. Output controllers could include controllers for any of a variety of known display devices for presenting information to a user, whether a human or a machine, whether local or remote. In the presently described embodiment, the functional elements of a computer communicate with each other via a system bus. Some embodiments of a computer may communicate with some functional elements using network or other types of remote communications. As will be evident to those skilled in the relevant art, an instrument control and/or a data processing application, if implemented in software, may be loaded into, and executed from system memory and/or a memory storage device. All or portions of the instrument control and/or data processing applications may also reside in a read-only memory or similar device of the memory storage device, such devices not requiring that the instrument control and/or data processing applications first be loaded through input-output controllers. It will be understood by those skilled in the relevant art that the instrument control and/or data processing applications, or portions of it, may be loaded by a processor, in a known manner into system memory, or cache memory, or both, as advantageous for execution. Also, a computer may include one or more library files, experiment data files, and an internet client stored in system memory. For example, experiment data could include data related to one or more experiments or assays, such as detected signal values, or other values associated with one or more sequencing by synthesis (SBS) experiments or processes. Additionally, an internet client may include an application enabled to access a remote service on another computer using a network and may for instance comprise what are generally referred to as "Web Browsers." In the present example, some commonly employed web browsers include Microsoft Internet Explorer available from Microsoft Corporation, Mozilla Firefox from the Mozilla Corporation, Safari from Apple Computer Corp., Google Chrome from the Google Corporation, or other type of web browser currently known in the art or to be developed in the future. Also, in the same or other embodiments an Internet client may include, or could be an element of, specialized software applications enabled to access remote information via a network such as a data processing application for biological applications.

A network may include one or more of the many various types of networks well known to those of ordinary skill in the art. For example, a network may include a local or wide area network that may employ what is commonly referred to as a TCP/IP protocol suite to communicate. A network may include a network comprising a worldwide system of interconnected computer networks that is commonly referred to as the Internet, or could also include various intranet architectures. Those of ordinary skill in the related arts will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

Alternative Array Configurations and Puddle Monitoring

Figure 19A:
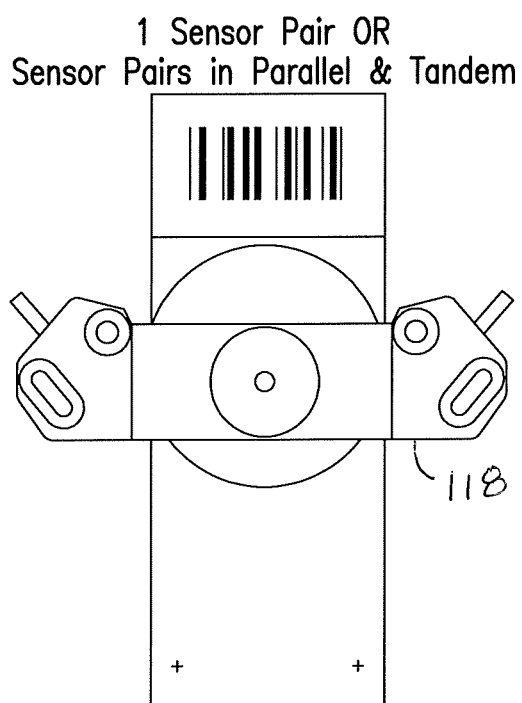
FIG. 19A shows a disclosed dispense detector having 1 emitter/receiver pair or a dispense detector having 2 pairs of emitters/receivers arranged in parallel.
Figure 19B:
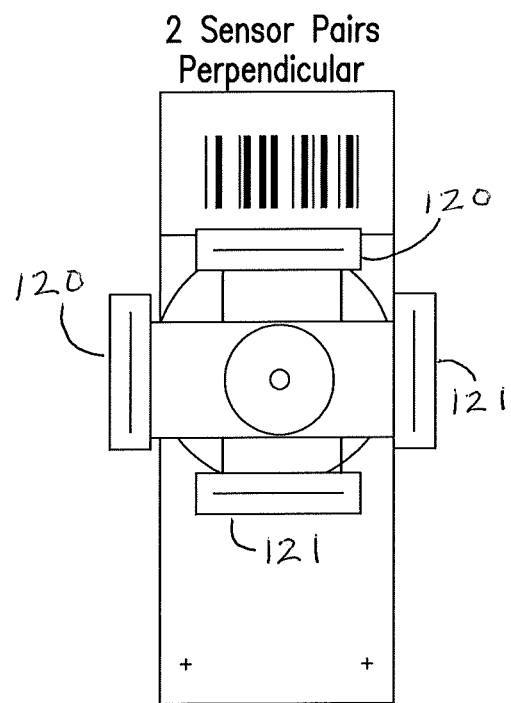
FIG. 19B shows a disclosed dispense detector having 2 pairs of emitters/receivers arranged perpendicular to each other.

As was discussed above, FIG. 19A and FIG. 19B show alternative configurations for how 1 or 2 arrays can be configured for dispense detection between a dispenser and a biological sample. In FIG. 19A, the dispense detector can either be a single array, or a pair of arrays (not explicitly shown), positioned parallel or anti-parallel to each other. Alternatively, as shown in FIG. 19B, pairs of arrays can be arranged perpendicular to one another such that light paths between emitters (120) and corresponding receivers (121) cross each other at right angles. It is possible to arrange arrays in other orientations relative to each other, and it is possible to include more than 3, such as more than 4, or even more than 5 sensor arrays in a dispense detector to gain additional and/or different information regarding a dispensing event and the result of that dispensing event.

In another embodiment, an array can be positioned above a flat substrate (for example, a microscope slide) at a height selected such that light paths between emitters and corresponding receivers of the array are blocked when a liquid is present on the surface of the substrate. Particularly, the height selected can be such that a pre-selected volume of liquid placed onto the substrate will block some portion of light from reaching the receivers. The array in this embodiment can provide confirmation of and/or a measure of a particular coverage (related to the volume, and depending on the liquid and the substrate onto which the liquid is placed) being achieved by a dispensing event. The array of this embodiment can also confirm whether the fluid is in the correct spatial position on the substrate. For example, if each receiver of the array is separately monitored, the position of the puddle can be detected (by detecting which of the receivers are blocked by the puddle from receiving light from the emitters) to confirm whether the puddle is in the correct location, for example, on the portion of the substrate where a biological sample is normally placed. Likewise, monitoring of the separate receivers can be utilized to determine if there are separate objects spread across the surface of the substrate (such as in separate droplets). The puddle can also be monitored during a second dispense event to ensure that addition of a second liquid to an existing puddle does not cause some amount of liquid to wick or otherwise be removed from the substrate. For example, a fast moving dispensing event of a second liquid into a first liquid already in place on a substrate could splash itself along with some of the first liquid from the substrate and actually reduce the amount of fluid on the substrate. Likewise, if addition of a second liquid to a first liquid already in place on the substrate expands (such as if the dispense was too large) and/or moves the puddle to a position such that a wicking path off of the substrate is established, the amount of liquid could be reduced. Detecting such an event can help ensure that a potential analysis error can at least be recognized if not remediated. Monitoring of a puddle according to this embodiment can also be used to monitor evaporation of a liquid from the substrate surface, for example, when the substrate is heated to facilitate a process taking place with the biological sample.

In a more particular embodiment, a second array could be utilized to monitor liquid coverage either at the same height as the first height or at another, different height above the substrate. As with the first array, the position of the puddle could be determined using the separate receiver signals from the second array. Advantageously, the first and second arrays according to this embodiment could be configured such that the light path from emitter to corresponding receiver in the first array is perpendicular to the light paths of the second array. Use of a perpendicular pair arrays can provide a second dimension to a determination as to whether a puddle is in a predetermined location on the substrate. Also advantageously, the first and second arrays could operate at different wavelengths of radiation so that they do not interfere with each other through scattering. For example, bandpass or cut-off filters could be placed over the receivers of the different arrays to help ensure that different arrays do not interfere with each other and produce erroneous signals.

In yet another embodiment, an additional array(s) is (are) positioned to monitor a space below a substrate such that a fluid spilling, splashing, running, or otherwise flowing off the surface of the substrate could be detected and/or characterized.

In yet another embodiment, the puddle formed by depositing a liquid reagent onto the surface of a microscope slide can be monitored as a surrogate of the dispensing event itself. Thus, in a particular embodiment, two or more, such as three or more, or even four or more arrays of emitters and corresponding receivers are placed along the length of a microscope slide on opposite sides of the microscope slide such that the planes of their detection regions are perpendicular to a surface of the microscope slide on which a biological sample is held, and the arrays span a vertical dimension above (and possibly below) the microscope slide. As such, the microscope slide may block a small portion of the light in each array from reaching the corresponding receivers, but a puddle placed on top of the slide will block an additional amount of light. Looking at the puddle "sideways" with such a set of arrays may provide a measure of where on the slide's upper surface the liquid is located, and how high above the surface the liquid reagent sits above the upper surface. Accordingly, a liquid coverage map of the surface of the slide may be obtained. In addition to determining locations and amounts of liquid at various locations on the slide, such a system of sideways looking arrays may be used to follow puddle dynamics such as during mixing, for example, mixing utilizing an air vortex mix. Thus, for example, such a system may be used to help determine the extent that liquid is actually moving on the slide and to where it is moving.

Overall, any combination of one or more arrays can be used to monitor one or more characteristics that can be compared with pre-determined values to flag a fluidic dispensing event that is expected to negatively affect treatment of a biological sample. Furthermore, any combination of arrays can be utilized to provide such useful characteristics. For example, one or more arrays along a dispense path between a dispenser and a biological sample could be combined with one or more arrays for monitoring a puddle on a substrate (parallel to the surface on which the puddle sits, perpendicular to the surface on which the puddle sits, or both). Alternatively, one or more arrays along a dispense path between a dispenser and a biological sample could be combined with one or more arrays positioned beneath a substrate onto which a liquid is to be deposited. Furthermore, one or more arrays along a dispense path between a dispenser and a biological sample could be combined with one or more arrays positioned beneath a substrate onto which a liquid is to be deposited and one or more arrays for monitoring a puddle on a substrate. It is also possible to combine one or more arrays for monitoring a puddle with one or more arrays positioned beneath a substrate onto which a liquid is to be deposited, or arrays along the dispense path can be combined with both arrays to monitor the puddle (parallel, perpendicular, or both) and arrays to monitor the space below the substrate.

Various modifications of the invention, in addition to those described herein, will be apparent to those skilled in the art from the foregoing description. Such modifications are also intended to fall within the scope of the appended claims.

Reference numbers, if recited in the claims, are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. As used herein, the "comprising" is an open-ended term and is used interchangeably with the term "including." Thus, for example, a description of a system comprising (including) features A and B also covers a system comprising (including) features A, B and C. In some embodiments, descriptions of the invention described herein using the phrase "comprising" includes embodiments that could be described as "consisting of," and as such the written description requirement for claiming one or more embodiments of the present invention using the phrase "consisting of" is met.

Any reference numbers recited in the claims shall be solely for ease of examination of this patent application, as they are exemplary, and are not intended in any way to limit the scope of the claims to the particular features having the corresponding reference numbers in the drawings.

REFERENCES

U.S. Pat. No. 5,141,871, 1992 Aug. 25, Kureshy et al.
U.S. Pat. No. 6,541,757, 2003 Apr. 1, Bieman
U.S. Pat. No. 6,708,079, 2004 Mar. 16, Mason
U.S. Pat. No. 8,004,683, 2011 Aug. 23, Tokhtuev et al.
U.S. Pat. No. 9,010,580, 2015 Apr. 21, Rolek
US20070041875, 2007 Feb. 22, Bach

The invention claimed is:

1. A system for treating a biological sample, comprising:
   a. at least one dispenser for dispensing a liquid reagent;
   b. at least one dispense detector locatable between an outlet of the at least one dispenser and the biological sample, the dispense detector comprising at least one array of emitters and corresponding receivers, the space between the emitters and corresponding receivers of the at least one array forming a first detection region of the at least one dispense detector; and,
   c. a dispense detection unit configured to receive a signal from the at least one dispense detector during one or more dispensing events and output a detected volume, shape, and/or velocity of the dispensed liquid reagent; and wherein the dispense detection unit is further configured to integrate, over time, a product of a velocity of the liquid reagent passing through the at least one dispense detector and the signal received from the at least one dispense detector, wherein the integrated signal provides a detected dispense volume for the liquid reagent dispensed from the at least one dispenser; and
   d. a dispense error unit configured to compare the one or more detected dispense events to one or more predetermined corresponding expected characteristics of the liquid reagent.

2. The system of claim 1, wherein the dispense detector comprises at least two arrays of emitters and corresponding receivers and wherein the at least two arrays of emitters and corresponding receivers form the first detection region and a second, different detection region of the dispense detector.

3. The system of claim 2, wherein the at least two arrays of emitters are each positioned such that light paths between the emitters and corresponding receivers of the at least two arrays are parallel to each other.

4. The system of claim 2, wherein light emitted by a first emitter of the at least two arrays emitters comprises a first wavelength and wherein light emitted by a second emitter of the at least two arrays of emitters comprises a second wavelength, wherein the first and second wavelengths are different.

5. The system of claim 1, wherein the dispense detector comprises at least three arrays of emitters and corresponding receivers, wherein two arrays of the at least three arrays of emitters are each positioned such that light paths between the emitters and corresponding receivers of the two arrays are non-parallel to each other.

6. The system of claim 1, wherein the dispenser, the dispense detection unit, and a holder for the biological sample are configured to provide relative motion between at least two of the dispenser, the dispense detector, and the holder for the biological sample, the system further comprising a controller for controlling the relative motion and for initiating the one or more dispensing events.

7. The system of claim 6, wherein the holder for the biological sample and the dispense detector are held stationary and the dispenser is configured to move into position relative to the biological sample and dispense the liquid reagent through the dispense detector to the biological sample.

8. The system of claim 6, wherein the dispenser and the dispense detector are coupled to each other in a dispense assembly such that relative motion between the holder for the biological sample and the dispense assembly positions the dispenser and dispense detection unit to dispense the liquid reagent through the dispense detector to the biological sample.

9. The system of claim 6, wherein the dispenser and the dispense detector are configured to move independently of each other.

10. The system of claim 1, wherein light emitted from the at least one array of emitters comprises a wavelength that is substantially absorbed by the liquid reagent.

11. The system of claim 10, wherein the wavelength is in the infrared spectrum.

12. A method for detecting a dispensing event, comprising:
 a. positioning a dispense detector between a dispenser and a biological sample along a path a liquid reagent is expected to follow between the dispenser and the biological sample, the dispense detector comprising at least one array of emitters and corresponding receivers, the space between the emitters and corresponding receivers of the at least one array forming a first detection region of the at least one dispense detector;
 b. collecting a signal generated by the dispense detector in response to the dispensing event;
 c. generating a processed signal, wherein the generating of the processed signal comprises applying a signal processing algorithm to the collected signal generated by the dispense detector to remove or reduce signal artifacts due to optical properties of the liquid reagent; and
 d. integrating, over time, a product of a velocity of the liquid reagent passing through the dispense detector during the dispensing event and the processed signal, wherein the integrated signal provides a detected dispense volume for the liquid reagent delivered to the biological sample during the dispensing event object; wherein the integrating is performed using an integration algorithm.

13. The method of claim 12, wherein the dispense detector comprises at least two arrays of emitters and corresponding receivers and wherein the at least two arrays of emitters and corresponding receivers form the first detection region and a second, different detection region of the dispense detector.

14. The method of claim 13, wherein the at least two arrays of detectors are placed along a length of a microscope slide on opposite sides of the microscope slide such that planes of their detection regions are perpendicular to a surface of the microscope slide on which a biological sample is held.

15. The method of claim 14, wherein the dispense detector further comprises a third array of detectors arranged beneath the microscope slide.

16. The method of claim 13, wherein a first array of the at least two arrays of emitters and corresponding receivers is positioned above a microscope slide; and wherein a second array of the at least two arrays of emitters and corresponding receivers is positioned beneath a microscope slide.

17. The method of claim 16, wherein the dispense detector further comprises a third array of emitters and corresponding receivers.

18. The method of claim 12, wherein the dispense detector further comprises one or more arrays of emitters and corresponding receivers configured to monitor a puddle of a liquid positioned on a surface of a slide.

19. The method of claim 12, wherein the signal processing algorithm comprises passing the collected signal through one or more low-pass filters.

20. A method for detecting a dispensing event, comprising:
 a. positioning a dispense detector between a dispenser and a biological sample along a path a liquid reagent is expected to follow between the dispenser and the biological sample, the dispense detector comprising at least one array of emitters and corresponding receivers, the space between the emitters and corresponding receivers of the at least one array forming a first detection region of the at least one dispense detector, wherein the dispense detector further comprises one or more arrays of emitters and corresponding receivers configured to monitor a puddle of a liquid positioned on a surface of a slide;
 b. collecting a signal generated by the dispense detector in response to the dispensing event; and,
 c. integrating, over time, a product of a velocity of the liquid reagent passing through the dispense detector during the dispensing event and the signal generated by the dispense detector in response to the dispensing event, wherein the integrated signal provides a detected dispense volume for the liquid reagent delivered to the biological sample during the dispensing event.

* * * * *